(12) United States Patent
Zheng

(10) Patent No.: US 9,188,703 B2
(45) Date of Patent: Nov. 17, 2015

(54) CURABLE COATING COMPOSITIONS PROVIDING ANTISTATIC ABRASION RESISTANT COATED ARTICLES

(71) Applicant: ESSILOR INTERNATIONAL (COMPAGNIE GENERALE D'OPTIQUE), Charenton-le-Pont (FR)

(72) Inventor: Haipeng Zheng, Clearwater, FL (US)

(73) Assignee: Essilor International (Compagnie Générale d'Optique), Charenton (FR)

( * ) Notice: Subject to any disclaimer, the term of this patent is extended or adjusted under 35 U.S.C. 154(b) by 142 days.

(21) Appl. No.: 13/720,500

(22) Filed: Dec. 19, 2012

(65) Prior Publication Data
US 2013/0288004 A1 Oct. 31, 2013

Related U.S. Application Data

(63) Continuation of application No. 12/158,925, filed as application No. PCT/EP2008/055855 on May 13, 2008, now Pat. No. 8,362,133.

(60) Provisional application No. 60/938,873, filed on May 18, 2007.

(51) Int. Cl.
| | |
|---|---|
| *C09D 135/06* | (2006.01) |
| *G02B 1/10* | (2015.01) |
| *B82Y 30/00* | (2011.01) |
| *C09D 5/24* | (2006.01) |
| *C09D 183/06* | (2006.01) |
| *C08K 3/36* | (2006.01) |
| *C08K 5/5435* | (2006.01) |
| *C08L 65/00* | (2006.01) |

(52) U.S. Cl.
CPC .................. *G02B 1/105* (2013.01); *B82Y 30/00* (2013.01); *C09D 5/24* (2013.01); *C09D 183/06* (2013.01); *C08G 2261/3223* (2013.01); *C08G 2261/51* (2013.01); *C08K 3/36* (2013.01); *C08K 5/5435* (2013.01); *C08L 65/00* (2013.01); *Y10T 428/24413* (2015.01); *Y10T 428/24975* (2015.01); *Y10T 428/254* (2015.01); *Y10T 428/257* (2015.01); *Y10T 428/259* (2015.01); *Y10T 428/265* (2015.01)

(58) Field of Classification Search
CPC ...................................................... G02B 1/105
USPC ......................................................... 428/148
See application file for complete search history.

(56) References Cited

U.S. PATENT DOCUMENTS

| | | | |
|---|---|---|---|
| 4,294,950 A | 10/1981 | Kato | 528/14 |
| 4,571,365 A | 2/1986 | Ashlock et al. | |
| 6,084,040 A | 7/2000 | Jonas et al. | 525/535 |
| 6,211,274 B1 | 4/2001 | Tanegashima et al. | 524/399 |
| 6,479,228 B2 | 11/2002 | Majumdar et al. | 430/527 |
| 6,663,956 B2 | 12/2003 | Heberger et al. | 428/332 |
| 7,527,853 B2 | 5/2009 | Asai | |
| 2003/0161941 A1 | 8/2003 | Kirchmeyer et al. | 427/58 |
| 2005/0239933 A1 | 10/2005 | Lee et al. | |
| 2008/0138597 A1 | 6/2008 | Asai | |

FOREIGN PATENT DOCUMENTS

| | | |
|---|---|---|
| EP | 0 962 943 | 12/1999 |
| EP | 1 847 386 | 10/2007 |
| EP | 1 956 049 | 8/2008 |
| JP | 2001-152138 | 5/2001 |
| JP | 2002-129102 | 5/2002 |
| JP | 2003-119384 | 4/2003 |
| JP | 2003-292655 | 10/2003 |
| WO | WO 2006-082944 | 8/2006 |
| WO | WO 2008-015223 | 2/2008 |

OTHER PUBLICATIONS

International Search Report and Written Opinion, issued in International Patent Application No. PCT/EP2008/0055855, mailed Sep. 3, 2009.
Office Communication in U.S. Appl. No. 12/158,925 mailed Nov. 14, 2011.
Response to Restriction Requirement dated Nov. 14, 2011 filed Dec. 14, 2011 in U.S. Appl. No. 12/158,925.
Office Communication in U.S. Appl. No. 12/158,925 mailed Jan. 26, 2012.
Response to Office Action Dated Jan. 26, 2012 filed Jul. 26, 2012 in U.S. Appl. No. 12/158,925.
Notice of Allowance in U.S. Appl. No. 12/158,925 mailed Sep. 17, 2012.
Amendment after Allowance in U.S. Appl. No. 12/158,925, filed Dec. 17, 2012.

*Primary Examiner* — Doris Lee
(74) *Attorney, Agent, or Firm* — Tara L. Clothier

(57) ABSTRACT

Curable composition providing, upon curing, an abrasion resistant, transparent, antistatic coating comprising: a) at least one conductive polymer, b) colloidal particles of at least one non-conductive oxide, c) at least one binder comprising at least one epoxysilane having at least two hydrolysable groups directly linked to the Si atom of the epoxysilane, and/or its hydrolysis product, said at least one conductive polymer and said colloidal particles of at least one non-conductive oxide being substantially not agglomerated, the content of said conductive polymer in the dry extract of said curable composition ranging from 0.1 to 10% by weight, preferably from 0.2 to 10% by weight and the content of the dry extract of said at least one epoxysilane in the dry extract of said curable composition ranging from 20 to 80% preferably 25 to 60% by weight based on the total weight of the dry extract.

27 Claims, No Drawings

CURABLE COATING COMPOSITIONS PROVIDING ANTISTATIC ABRASION RESISTANT COATED ARTICLES

This application is continuation of U.S. patent application Ser. No. 12/158,925 filed on Nov. 17, 2009, which is a national phase application under 35 U.S.C. §371 of International Application No. PCT/EP2008/055855 filed 13 May 2008, which claims priority to U.S. Provisional Application No. 60/938,873 filed 18 May 2007. The entire text of each of the above-referenced disclosures is specifically incorporated herein by reference without disclaimer.

BACKGROUND OF THE INVENTION

1. Field of the Invention

The present invention relates to curable compositions for preparing antistatic transparent abrasion resistant coatings and articles exhibiting antistatic and abrasion resistance properties coated therewith.

The invention also relates to articles, especially optical and ophthalmic lenses for eyeglasses comprising at least one antistatic coating obtained by depositing and curing a curable coating according to the invention.

2. Description of Related Art

It is well known that optical articles, which are composed of essentially insulating materials, have a tendency to get charged with static electricity, especially when they are cleaned in dry conditions by rubbing their surface with a cloth or synthetic piece, for example a polyester piece (triboelectricity). The charges which are present at the surface of said optical articles create an electrostatic field capable of attracting and fixing. As long as the charge remains on optical articles, objects lying in the vicinity thereof (a few centimeters) that have a very little weight, generally small size particles such as dusts.

In order to decrease or suppress attraction of the particles, it is necessary to decrease the intensity of the electrostatic field, i.e. to decrease the number of static charges which are present at the surface of the article. This may be carried out by imparting mobility to the charges, for instance by introducing in the optical article a layer of a material inducing a high mobility of the charges. Materials inducing the highest mobility are conductive materials. Thus, a material having a high conductivity allows for a more rapid dissipation of charges.

By "antistatic", it is meant the property of not retaining and/or developing an appreciable electrostatic charge. An article is generally considered to have acceptable antistatic properties when it does not attract or fix dust or small particles after one of its surfaces has been rubbed with an appropriate cloth. It is capable of quickly dissipating accumulated electrostatic charges.

This property is often related to the static potential of the material. When the static potential of the material (measured when the article has not been charged) is 0 KV+/−0.1 KV (in absolute value), the material is antistatic. When its static potential is different from 0 KV+/−0.1 KV (in absolute value), the material is said to be static.

The ability of a glass to evacuate a static charge created by rubbing with a cloth or any other electrostatic charge generation process (charge applied by corona . . . ) can be quantified by measuring the time required for said charge to be dissipated (charge decay time). Thus, antistatic glasses have a discharge time in the order of 100-200 milliseconds, while static glasses have a discharge time in the order of several tenths seconds, sometimes even several minutes. A static glass having just been rubbed can thus attract surrounding dusts as long as it requires time to get discharged.

It is known in the art to prepare conductive inorganic and organic layers for anti-static applications.

It is known to achieve high optical transparency in anti-static coatings (over 90% or even 95% transmittance in the visible light) by using vacuum-deposited ITO layers.

However, the performance of ITO is affected when applied to plastic. These thin coatings are fragile and are readily damaged during bending or other stress inducing conditions.

Coatings comprising conducting polymers such as Baytron P® are also known as being able to impart antistatic properties.

The use of Baytron P® is known in different commercial applications such as photographic films, electronics packaging and imaging materials.

However, Baytron P® antistatic hard coatings with overall excellent performances, including high transmittance, low haze, and excellent adhesion and abrasion resistance, have been barely addressed in prior art, especially in ophthalmic lens field.

U.S. Pat. No. 6,663,956 to Heberger et al describes that Baytron PH®-based antistatic coatings show adhesion and high transmittance by optimizing the concentration of surfactants and nanoparticles. A high level of surfactant is used. The coating solutions as well as the coatings comprise low level of polymeric binders. The resulting coatings still present some haze.

This antistatic coating is preferably not overcoated with another coating. Such a top coating could limit the ability of the antistatic coating to prevent static effects.

U.S. Pat. No. 6,479,228 to Majumdar also discloses transparent Baytron P®-based coatings exhibiting some scratch resistance and antistatic properties, but the Taber Δhaze value is not fully satisfying.

U.S. Pat. No. 6,211,274 describes coating compositions comprising a composite colloid which is prepared by mixing a conductive oxide such as a conductive zinc antimonate and a conductive polymer such as Baytron P®. The inorganic-organic composite conductive sol of the conductive oxide and the conductive polymer thus obtained has a particle size of 100 to 300 nm, measured by a laser scattering method.

The polythiophene colloids are adsorbed on or bonded to the periphery of the anhydrous zinc antimonate. Practically, the size of the composite particles between is 151 and 193 nm.

This size of particles is quite high for an application in the optical field, especially in the ophthalmic field, and particularly for eyeglasses and may lead to articles exhibiting a certain level of haze non acceptable in the ophthalmic field.

U.S. Pat. No. 6,084,040 discloses a scratch resistant conductive coating of polythiophene salts wherein silanes have been hydrolyzed in the presence of the conductive polythiophene salts and the use thereof for the production of scratch-resistant electrically conductive coatings.

Tetraalkoxysilanes and alkyl or aryltrialkoxysilanes are used as silanes.

Fillers, for example silicon dioxide, such as colloidal silicon dioxide, titanium dioxide and zinc oxide, can be added to the coatings and form transparent coatings.

The coatings can also comprise additives improving adhesion to the respective substrate, such as epoxysilanes and γ-glycidoxypropyltrimethoxysilane.

However, none of the examples of this patent describes compositions containing fillers.

γ-glycidoxypropyl trimethoxysilane is merely used as an optional component. The components that have to be used in the conductive coatings of U.S. Pat. No. 6,084,040 are tetraalkoxysilanes and alkyl or aryl trialkoxysilanes that do not contain epoxy groups. Such components are generally used as the main components of the conductive coating composition.

This document does not mention any reference to the use in ophthalmic articles such as eyeglass lenses.

As seen above, the antistatic hard coatings of the prior art still have certain limitations preventing them from some specific applications, especially in the ophthalmic lens application.

Therefore, conductive coatings providing antistatic properties, having low haze and excellent hardness and/or abrasion resistance at the same time are very desirable in these specific applications.

There is still a need for coating compositions that can retain their antistatic properties inside a stack of several layers, including inorganic dielectric layers deposited thereon.

SUMMARY OF THE INVENTION

Therefore, a first object of the invention is to provide a novel curable coating composition which is capable of imparting antistatic and abrasion resistant properties to an article, especially a transparent article and avoids the drawbacks of the prior art compositions.

Especially, the coatings obtained by curing the curable compositions of the invention have a low haze along with very good antistatic properties and very good hardness and abrasion resistance.

To achieve the foregoing objects, there is provided a curable composition providing, upon curing, an abrasion resistant, transparent, antistatic coating comprising:

a) at least one conductive polymer,
b) colloidal particles of at least one non-conductive oxide,
c) at least one binder comprising at least one epoxysilane having at least two hydrolysable groups directly linked to the Si atom of the epoxysilane, and/or its hydrolysis product, said at least one conductive polymer and said colloidal particles of at least one non-conductive oxide being substantially not agglomerated, the content of said conductive polymer in the dry extract of said curable composition ranging from 0.1 to 10% by weight, preferably from 0.2 to 10% by weight and the content of the dry extract of said at least one epoxysilane in the dry extract of said curable composition ranging from 20 to 80%, preferably 25 to 60% by weight, based on the total weight of the dry extract.

Due to its properties, the curable coating compositions of the present invention can be used in different stacks and still provide antistatic properties to an article, even if other functional coatings, especially antireflective coatings of dielectric materials are deposited over said coating.

Thus the invention also relates to an article having at least one surface comprising an abrasion resistant antistatic coating obtained by depositing and curing a curable coating composition according to the invention.

The invention also relates to articles having additional properties along with abrasion resistance depending on the formulation of the curable composition.

Especially, another embodiment of the invention relates to an article bearing a nanostructured coating that provides ultrahigh hydrophobic properties, along with antistatic and abrasion resistant properties.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

When the optical article comprises one or more surface coatings, the term "to deposit a layer onto the optical article" means that a layer is deposited onto the outermost coating of the optical article.

The outer layer in a coating stack is the layer that is the closest to the air, before deposition of another coating(s).

The article onto which the coating composition of the inventions is preferably deposited is a transparent, preferably optical article, more preferably a lens, and better an ophthalmic lens or lens blank. The coating compositions of the invention can be used for manufacturing optical articles coated on their convex main side (front side), concave main side (back side), or both sides.

Herein, the term "lens" means an organic or inorganic glass lens, preferably an organic lens, comprising a lens substrate which may be coated with one or more coatings of various natures.

The curable coating composition of the present invention provides, upon curing, a functional coating having antistatic properties. It will be sometimes referred in this patent application as the "antistatic composition".

The method for calculating the content of dry extract or solid content of each component of the coating composition of the invention is detailed in the following description.

If it is not possible to make the calculation, the dry extract of each component is determined by simple experimentation, i.e. evaporation of the solvent(s) contained in each component and measurement of the solid content.

According to the invention, the curable composition providing, upon curing, an abrasion resistant, transparent, antistatic coating comprises at least one binder comprising at least one epoxysilane having at least two hydrolysable groups directly linked to the Si atom of the epoxysilane, and/or its hydrolysis product. The epoxysilane may comprise one or several epoxy groups, preferably only one in its molecule.

Preferably the at least one epoxysilane has the following formula:

$$R_n Y_m Si(X)_{4-n-m} \qquad \text{(III)}$$

Wherein R groups, identical or different, are monovalent organic groups linked to the Si atom by a carbon atom and comprising at least one, preferably one epoxy function; X groups, identical or different are hydrolyzable groups; Y is a monovalent organic group linked to the Si atom by a carbon atom, preferably an alkyl group having 1 to 6 carbon atoms, n and m being integers such as n=1 or 2 and n+m=1 or 2.

Hydrolyzable groups X designate independently from each other and without limitation alkoxy groups —O—$R^1$, wherein $R^1$ preferably represents a linear or branched alkyl group, preferably a $C_1$-$C_4$ alkyl group or an alkoxyalkyl group, an acyloxy group —O—C(O)$R^3$ wherein $R^3$ is an alkyl group, preferably a $C_1$-$C_6$ alkyl group, better an ethyl or methyl group, halogens such as Cl or Br, amino group optionally substituted by one or two functional groups such as an alkyl group or silane group, for example group —NHSi$Me_3$.

Preferably X groups are alkoxy groups, more preferably methoxy, ethoxy, propoxy oubutoxy, and better methoxy or ethoxy groups, which means that compounds III are preferably epoxyalkoxysilanes.

Monovalent R groups preferably comprise at least one single epoxy function.

By epoxy function, one means a group of several atoms wherein an oxygen atom is directly linked to two adjacent or non adjacent, preferably adjacent, carbon atoms containing chain or cyclic carbon system.

Between these epoxy functions, oxirane functions are preferred, i.e. saturated cyclic ether groups with three links.

Preferred R groups have the following formulas V and VI:

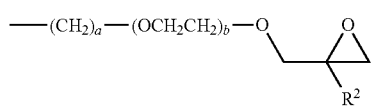

V

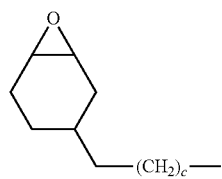

VI wherein $R^2$ is an alkyl group, preferably a methyl group or a hydrogen atom, more preferably a hydrogen atom; a and c are integers ranging from 1 to 6 and b is representing 0, 1 or 2.

The preferred group of formula V is γ-glycidoxypropyl group ($R^2$=H, a=3, b=0) and the preferred (3,4-epoxycyclohexyl)alkyl group of formula VI is β-(3,4-epoxycyclohexyl) ethyl c=1). The γ-glycidoxyethoxypropyl group can also be used ($R^2$=H, a=3, b=1).

Preferred epoxysilanes of formula III are epoxyalkoxysilanes preferably having one group R (n=1) and preferably three alkoxy groups, preferably $OCH_3$, directly linked to the Si atom.

Particularly preferred epoxytrialkoxysilanes have the formulas corresponding to the following formulas VII et VIII:

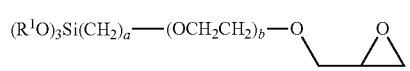

VII

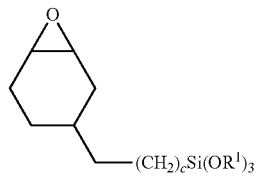

VIII wherein $R^1$ designates an alkyl group having 1 to 6 carbon atoms, preferably a methyl or ethyl group and a, b et c are such as defined above.

Examples of epoxyalkoxysilanes of formula VII are γ-glycidoxy methyl trimethoxysilane, γ-glycidoxy methyl triethoxysilane, γ-glycidoxy methyl tripropoxysilane, γ-glycidoxy ethyl trimethoxysilane, γ-glycidoxy ethyl triethoxysilane, γ-glycidoxy ethyl trimethoxysilane, γ-glycidoxy ethyl triethoxysilane, γ-glycidoxy ethyl tripropoxysilane, γ-glycidoxy propyl trimethoxysilane, γ-glycidoxy propyl triethoxysilane, γ-glycidoxy propyl tripropoxysilane, γ-glycidoxy propyl trimethoxysilane, γ-glycidoxy propyl triethoxysilane, γ-glycidoxy propyl tripropoxysilane, γ-glycidoxy propyl trimethoxysilane, γ-glycidoxy propyl triethoxysilane, γ-glycidoxy propyl tripropoxysilane, hydrolyzates thereof, and mixtures thereof.

Other examples of usable epoxytrialkoxysilanes are given in U.S. Pat. No. 4,294,950.

The preferred epoxyalkoxysilanes are chosen in the group consisting of γ-glycidoxypropyl triethoxysilane, γ-glycidoxypropyl trimethoxysilane, 2-(3,4-epoxycyclohexyl) ethyltrimethoxysilane and 2-(3,4-epoxycyclohexyl) ethyltriethoxysilane or a mixture of two or more thereof.

γ-glycidoxypropyltrimethoxysilane (GLYMO) which is commercialized among others by Merck is preferred.

The content of the dry extract of the at least one epoxyalkoxysilane in the dry extract of the curable composition is ranging from 20 to 80%, preferably 25 to 60% by weight, based on the total weight of the dry extract The expression "dry extract or weight of solid material from epoxysilanes of formula $R_nY_mSi(X)_{4-n-m}$" means the theoretical dry extract from those silanes which is the calculated weight of unit $R_nY_mSi(O)_{(4-n-m)/2}$.

The presence of the epoxyalkoxysilane is mandatory in the composition. It provides a highly crosslinked matrix.

The preferred epoxysilanes having an organic link between the Si atom and the epoxy group also provide a certain level of flexibility.

Optionally, the binder may comprise at least one compound of formula:

$$M(Z)_x \quad (IX)$$

or a hydrolyzate thereof, in which M is a metal or metalloid, the Z groups are identical or different and represent hydrolyzable groups and x is the valence of the metal or metalloid M.

The Z groups in the compound of formula IX are identical or different from the X groups of formula III.

Consequently, the Z groups may represent hydrolyzable groups independently chosen from the hydrolyzable groups which have been previously cited when describing the X groups. It is worth noting that M-OH bonds may be initially present in the compounds of formula IX, which are considered in this case as hydrolyzates. Hydrolyzates also encompass metal or metalloid salts.

Preferred compounds of formula IX are metal or metalloid alkoxides and chlorides, ideally alkoxides $M(OR)_x$ wherein the R groups are independently an alkyl group, usually having 1-6 carbon atoms, such as ethyl, propyl, isopropyl, sec-butyl or butyl, and x is as defined above.

M represents a metal or metalloid, which valence x preferably ranges from 2 to 6.

Preferably, compounds of formula IX are tetravalent species (x=4). M atoms include but are not limited to metals such as Sn, Al, B, transition metals such as Zr, Hf, Sc, Nb, V, Y, Ba, Cr, Ta, W or Ti or metalloids such as silicon or germanium. M is more preferably silicon, zirconium, aluminum or titanium, and ideally silicon.

Most preferred compounds of formula IX having formula $Si(Z)_4$ are those in which the Z groups are hydrolyzable groups which are identical or different, preferably an alkoxy group, and better an ethoxy group. Examples of such compounds are tetraalkoxysilanes such as tetraethoxysilane $Si(OC_2H_5)_4$ (TEOS), tetramethoxysilane $Si(OCH_3)_4$ (TMOS), tetra(n-propoxy)silane, tetra(i-propoxy)silane, tetra(n-butoxy)silane, tetra(sec-butoxy)silane or tetra(t-butoxy)silane, preferably TEOS.

Examples of other compounds of formula IX which may be used are zirconium compounds, preferably zirconium alkoxides such as zirconium n-propoxide, aluminum compounds, preferably aluminum alkoxides such as aluminum-sec-butoxide and aluminum isopropoxide, titanium compounds, preferably tetra-alkyl titanates such as titanium tetra-ethoxide, titanium tetra-isopropoxide, tantalum alkoxides, trimethylborate, barium acetate and mixtures thereof.

The binder may comprise mixtures of any number of the above cited epoxysilanes of formula III, or mixtures of those silanes and compounds of formula IX. The content of dry extract of compound of formula IX in the dry extract of the curable composition is ranging from 0.5 to 30%, preferably ranging from 1 to 20%, and better from 2 to 10% by weight, based on the total weight of the dry extract. The expression "dry extract or weight of solid material from compound of formula IX" means the theoretical dry extract from those silanes which is the calculated weight of unit $MO_{x/2}$.

Compounds of formula IX or their hydrolyzates are improving the crosslinking of the coating obtained from the curable composition of the invention and thereby providing a high hardness.

In addition to the epoxysilane having at least two hydrolysable groups directly linked to the Si atom of the epoxysilane, and the optional compound of formula IX, the binder can comprise any film-forming material capable of improving adhesion of the curable coating of the invention to an underlying layer and/or an upper layer if any are present, and/or integrity of the antistatic coating (will be abbreviated by film forming material). The film forming material may also allow strengthening abrasion and/or scratch resistance of the final optical article, depending on its nature.

The film forming material has to be compatible with the conductive polymer, i.e. not be detrimental to its antistatic properties, and has to form a stable solution by avoiding precipitation of said conductive polymer or aggregation thereof in more or less big particles, which would generate optical flaws.

The choice of the film forming material is generally determined by the employed system of solvents in the coating composition, for it has to be soluble or dispersible in said system of solvents.

The film forming material preferably is a polymer material, generally organic. It may be formed from a thermoplastic or thermosetting material, optionally cross-linkable through polycondensation, polyaddition or hydrolysis. Mixtures of film forming materials from different categories may also be employed.

Film forming materials are preferentially soluble or dispersible in water or in an aqueous composition such as a hydro-alcoholic composition. Among water soluble or dispersible binders there may be cited homopolymers or copolymers of the following monomers: styrene, vinylidene chloride, vinyl chloride, alkyl acrylates, alkyl methacrylates, (meth)acrylamides, polyester homopolymers or copolymers, poly(urethane-acrylate), poly(ester-urethane), polyether, vinyl polyacetate, polyepoxyde, polybutadiene, polyacrylonitrile, polyamide, melamine, polyurethane, polyvinylic alcohol, copolymers thereof, and mixtures thereof. Among poly(meth)acrylate binders may be cited poly(methyl methacrylate).

The film forming material may be a water soluble polymer, or may be used in the form of a latex or a mixture of latexes.

As it is well known, latexes are stable dispersions of particles of at least one polymer in an aqueous medium. Preferred latexes are polyurethane latexes, poly(meth)acrylic latexes, polyester latexes and mixtures thereof. The latex may comprise hydrophilic functional groups such as sulfonic or carboxylic acid groups. As examples, polyester sulfones, such as the aqueous composition Eastek® 12100-02-30% commercialized by Eastman Chemical Company, and polyurethane sulfones may be cited. Optionally, the latex is of the core-shell type.

Poly(meth)acrylic latexes are generally latexes of copolymers mainly formed from (meth)acrylate monomers, such as for example ethyl, butyl, methoxyethyl or ethoxyethyl (meth)acrylate, and generally from a minor amount of at least another co-monomer, such as for example styrene.

Preferred poly(meth)acrylic latexes are acrylate-styrene copolymer latexes, which are commercially available from ZENECA RESINS under the trade name NEOCRYL®, such as NEOCRYL® A-639, or from B. F. Goodrich Chemical Co. under the trade name CARBOSET®, such as CARBOSET® CR-714.

Preferred polyurethane latexes are polyurethane latexes comprising polyester moieties, preferably aliphatic polyester moieties. Still preferably, polyurethane units are obtained by polymerizing at least one aliphatic polyisocyanate with at least one aliphatic polyol. Those latexes provide antistatic coatings based on polyurethane having polyester moieties.

Such polyurethane-polyester latexes are commercially available from ZENECA RESINS under the trade name Neorez® (e.g., Neorez® R-962, Neorez® R-972, Neorez® R-986, Neorez® R-9603) or BAXENDEN CHEMICALS, a subsidiary of WITCO Corporation, under the trade name Witcobond® (e.g., Witcobond® 232, Witcobond® 234, Witcobond® 240, Witcobond® 242). Other commercially available polyurethane latexes are Bayhydrol® 121 or Bayhydrol® 140AQ, commercialized by H. C. Starck.

Another film forming material category which may be used in the curable coating composition comprises film forming materials based on functionalized silane, siloxane or hydrolyzates thereof which are different from the compounds of formulas III and IX described above.

They may also act as adhesion promoters toward organic or mineral glass substrates. These film forming materials may also act as cross-linking agents toward conductive polymers used under the form of polystyrene sulfonate salts and the like.

As silicon containing film forming materials, may be cited silanes or siloxanes bearing an amine group or an alkyl group or an hydroxyl group or an unsaturated group, such as amino alkoxysilanes, hydroxy silanes, alkoxysilanes, preferably methoxy or ethoxy silanes, for example methyltrimethoxysilane, ureidoalkyl alkoxysilanes, dialkyl dialkoxysilanes (for example dimethyl diethoxysilane), vinylsilanes, allylsilanes, (meth)acrylic silanes, carboxylic silanes, polyvinylic alcohols bearing silane groups, and mixtures thereof.

After having been subjected to hydrolysis, the above cited organofunctional film forming polymers generate interpenetrated networks by forming silanol groups, which are capable of establishing bonds with the upper layer and/or the underlying layer if such a layer(s) is(are) present.

Amino alkoxysilane film forming polymers may be chosen from, without limitation: 3-amino propyl triethoxy silane, 3-amino propyl methyl dimethoxy silane, 3-(2-amino ethyl)-3-amino propyl trimethoxy silane, amino ethyl triethoxysilane, 3-(2-amino ethyl) amino propyl methyl dimethoxy silane, 3-(2-amino ethyl)-3-amino propyl triethoxy silane, 3-amino propyl methyl diethoxysilane, 3-amino propyl trimethoxysilane, and combinations thereof.

Ureidoalkyl alkoxysilane film forming polymers may be chosen from, without limitation: ureidomethyl trimethoxysilane, ureidoethyl trimethoxysilane, ureidopropyl trimethoxysilane, ureidomethyl triethoxysilane, ureidoethyl triethoxysilane, ureidopropyl triethoxysilane, and combinations thereof.

The above cited binders are only examples of film forming polymers which may be used in the invention, which is not limited to that list. The person skilled in the art will easily recognize other categories of compounds which may be used as film forming polymers of the present curable coating composition.

For the functionalized silane, the calculated weight means the weight of the siloxane unit $Q_k SiO_{(4-k)/2}$, wherein Q is a substituent preferably an organic substituent bonded with Si, typically by C—Si bonding and $Q_k SiO_{(4-k)/2}$ is derived from hydrolysates of $Q_k Si(OS)_{4-k}$ wherein S is a hydrolysable group such as alkyl or acyl group, k is 0, 1, 2 or 3.

For other film forming materials, it means the net weight of the film forming materials (without solvents).

Some additional cross linkers can be added in the curable conductive coating composition when the composition comprises a film forming material. It may be cross-linked or cured owing to the presence of at least one cross-linking agent which preferably is soluble or dispersible in water. These cross-linking agents are well known and react with functional groups of the binder, such as carboxyl or hydroxyl groups. They may be chosen from polyfunctional aziridines, methoxyalkylated melamine or urea resins, for example methoxyalkylated melamine/formaldehyde and urea/formaldehyde resins, epoxy resins, carbodiimides, polyisocyanates, triazines and blocked polyisocyanates. Preferred cross-linking agents are aziridines, in particular trifunctional aziridines.

Particularly recommended polyfunctional aziridines are commercialized under the trade name Neocryl CX-100® by ZENECA RESINS, XAMA-7® (pentaerythritol-tris-(β-(N-aziridinyl)propionate)) and XAMA-2® (trimethylolpropane-tris-(β-(N-aziridinyl)propionate)) by B. F. Goodrich Chemical Co.

A cross-linking agent of the polyisocyanate type which is dispersible in water is commercialized by UNION CARBIDE under the trade name XL-29 SE®. A cross-linking agent of the carbodiimide type which is dispersible in water is commercialized by BAYER under the trade name XP 7063®, and a cross-linking agent of the methoxymethylmelamine type is commercialized by CYTEC under the trade name CYMES® 303.

According to a particular embodiment of the invention, the content of the film forming material in the dry extract of the curable composition of the invention is preferably less than 10% by weight, more preferably less than 5% by weight, even better less than 2% by weight of the curable coating composition.

In a most preferred embodiment, there is no film forming material as defined above in the binder.

Preferably the curable composition does not comprise any film forming material in addition to the compounds of formula III or IX.

The curable coating composition comprises at least one conductive polymer.

The antistatic properties are provided by at least one conductive polymer which is either conjugated or not. Said at least one conductive polymer is organic by nature. By "conductive polymer," it is meant either a conductive polymer or a conductive copolymer.

Among conductive polymers, those leading to thin transparent layers are preferred. Examples of transparent, organic, conductive polymers may be polyanilines, such as those disclosed in U.S. Pat. Nos. 5,716,550 and 5,093,439, polypyrroles, such as those disclosed in U.S. Pat. Nos. 5,665,498 and 5,674,654, polythiophenes, such as those disclosed in U.S. Pat. Nos. 5,575,898, 5,403,467 and 5,300,575, polyethyleneimines, polyselenophenes, compounds based on allylamine such as poly(allylamine), polyvinylphenylene copolymers, derivatives of those polymers and mixtures thereof. They may be employed as mixtures. Other examples of conductive polymers can be found in "Conjugated Polymeric Materials: Opportunities in Electronics, Optoelectronics, and Molecular Engineering", J. L. Bredas and B. Silbey, Eds., Kluwer, Dordrecht, 1991, which is incorporated herein by reference.

Those conductive polymers are generally employed under a polycationic form (polyaniline cation, polypyrrole cation, polythiophene cation, poly(allylamine) cation . . . ), generally in combination with one or more polyanions. The polyionic compounds may be compounds including a charge in their main chain or compounds including ionizable side groups.

Polyanions, either conjugated or not, represent any type of polymer including ionizable groups, typically within the repeating unit, that are capable of supporting negative charges when ionized. They may be chosen, without limitation, from polymeric carboxylic or sulfonic acids anions (polyacids) and mixtures thereof. For example, polystyrene sulfonate (PSS), polyaniline sulfonate, polyvinyl sulfonate, polyacrylate, polymethacrylate, polymaleate, poly(thiophene-3-acetate) anions as well as anions of copolymers obtained by copolymerizing at least one acidic monomer such as acrylic, methacrylic, maleic, styrene sulfonic, or vinyl sulfonic acid with at least another monomer, either acidic or not, may be cited. Among said non acidic monomers, styrene or acrylic esters may be cited. Other examples of polyanions can be found in "Coulombic interactions in Macromolecular Systems" ACS Symposium Series No. 302, A. Eisenberg and F. Bailey Eds., 1986, which is hereby incorporated by reference. The preferred polyanion is polystyrene sulfonate.

The number average molecular weight of polyanion precursor polyacids generally ranges from 1000 to $2 \times 10^6$ g/mol, preferably from 2000 to 500000 g/mol.

Polyacids can be prepared by known methods or are commercially available, optionally under a metallic salt form.

Preferred conductive polymers are polypyrroles, polystyrene sulfonate, in particular the 3,4-dialkoxy substituted polypyrroles derivatives, and polythiophenes polystyrene sulfonate, in particular the 3,4-dialkoxy substituted polythiophenes derivatives, poly(3-alkylthiophenes), and mixtures thereof. Specific examples of preferred conductive polymers are poly(3,4-ethylenedioxythiophene)-poly(styrene sulfonate) and poly(3,4-ethylenedioxypyrrole)-poly(styrene sulfonate).

Conductive polymers are commercially available or may be prepared according to known methods. Polypyrroles polystyrene sulfonate, for example, can be synthesized by oxidation polymerization of pyrroles in aqueous medium, in the presence of poly(styrene sulfonic) acid and ammonium persulfate as an oxidant.

Preferably the curable composition comprises at least one conductive polymer in the form of particles of said conductive polymer.

Preferably, the particles of said conductive polymer have a size ranging from 2 to 150 nm, preferably from 2 to 30 nm.

The antistatic coating composition preferably comprises a dispersion of at least one conductive polymer in an aqueous or organic solvent, or a mixture of these solvents, and optionally one or more binders.

The antistatic coating composition is preferably an aqueous/alcoholic dispersion of particles of conductive polymer(s).

A conductive polymer dispersion suited for use in the invention is Baytron® P, based on polythiophene, developed by Bayer and commercialized by H. C. Starck. It is an aqueous dispersion of the polymer complex poly(3,4-ethylenedioxythiophene)-poly(styrene sulfonate), abbreviated as PEDT/PSS, which contains 1.3% by weight of the conductive polymer, poly(styrene sulfonate (PSS).

Baytron P® from Bayer AG is comprised of particles having a size of 10 to 100 nm.

Another recommended conductive polymer is Baytron PH500®. It is particularly preferred because the size (diameter or longest dimension) of the particles are smaller than Baytron P, most of the particles of Baytron PH500® having particle sizes ranging from 10 nm to 50 nm.

Preferred conductive polymers are water soluble or water dispersible, or soluble or dispersible in an alcohol or a mixture water/alcohol, so as to be able to be applied through a composition onto the substrate.

The curable coating may be formed at the surface of the substrate by liquid phase deposition according to any appropriate method known in the art or by lamination from a temporary support on which the coating has been deposited.

The curable coating composition of the invention may be preferably deposited in a sufficient amount so as to impart the desired antistatic (AS) properties, notably to at least one main surface of the final optical article, preferably to both main faces.

Preferably, said coating is deposited by spin coating, dip coating, spray coating, brush coating, or roller coating on the article. Spin coating or dip coating are preferred.

Conductive polymers can be substituted with very diverse functional groups, notably hydrophilic groups, preferably ionic or ionizables, such as the following groups: COOH, SO$_3$H, NH$_2$, ammonium, phosphate, sulfate, imine, hydrazino, OH, SH or salts thereof. Presence of these functional groups make easier the preparation of an aqueous AS coating composition, since they make conductive polymers more compatible with water and thus more soluble in the composition. This may improve the quality of the deposit.

The amount of solid conductive polymer(s) in the dry extract of the curable composition ranges from 0.1 to 10% by weight, more preferably from 0.2 to 10 weight %, better from 0.1 to 1.0% and even better from 0.15 to 0.5%, based on the total weight of the dry extract.

Beyond 10% by weight, the curable coating composition may be too viscous and the resulted antistatic coating may show a decreased transmittance, while below 0.1%, the composition may be too diluted and the resulting coating does not exhibit antistatic properties.

An important component of the curable coating composition of the invention is a non conductive oxide, generally an inorganic non conductive oxide, such as silicon oxide, aluminum oxide, zirconium oxide or a mixture of two or more thereof. They generally increase the hardness and/or the refractive index of the cured coating. Preferred inorganic particles are SiO$_2$ particles.

It is also possible to use composite particles, for example those having a core/shell structure.

Generally, based on the total weight of the dry extract, the content of said at least one non conductive oxide in the dry extract of the curable composition ranges from more than 2% up to 50% by weight, preferably 10% to 40% and even better 20 to 40%, based on the total weight of the dry extract.

The particles are used under colloidal form, i.e. under the form of fine particles, which diameter (or longest dimension) is preferably lower than 150 nm and still better lower than 100 nm, dispersed in a dispersing medium such as water, an alcohol, a ketone, an ester or mixtures thereof, preferably an alcohol.

One of the difficulties in the preparation of a composition exhibiting at the same time conductive properties along with hardness and/or abrasion resistance properties is to get a homogeneous dispersion having small size particles capable of being used in the optic field especially in the ophthalmic field, that is to say exhibiting a level of haze which does not prevent them from being used in this field.

This means that the colloidal particles of inorganic oxide are not substantially agglomerated with the conductive polymer.

It has been found that, with the coating compositions of the invention, there is achieved a sufficient conductive effect while maintaining abrasion resistance by using the antistatic polymer as defined above and that it is not necessary to add additional inorganic conductive particles as it was found sometimes necessary in the art to achieve the antistatic effect.

The mixing of conductive polymers and conductive oxides generally leads to precipitates due to agglomeration of particles, which means that the composition is no more useful to be deposited on transparent articles such as optical lenses.

Thus, the dry extract of the curable coating compositions of the invention preferably comprise less than 5% by weight of inorganic conductive particles, preferably less than 2% by weight and even better no inorganic conductive particles, based on the total weight of the dry extract.

Conductive colloid particles are for example transparent conductive oxide colloidal particles of tin oxide-doped indium oxide (ITO), antimony oxide-doped tin oxide (ATO), conductive zinc antimonite, conductive indium antimonate.

It is recommended that the particles of said at least one non conductive oxide have a size of less than or equal to 150 nm, preferably from 2 nm to 100 nm and better from 2 to 50 nm, and even better from 5 to 50 nm.

The size of the particles in the liquid is determined by conventional methods such as light scattering, and by a particle size analyzer. The size of the particles in the solid is determined by tunneling electron microscope or light scattering.

The conductive polymer and said colloidal particles are substantially not agglomerated.

The binder, which comprises the epoxysilane, the component of formula IX, the optional film forming material but does not include the inorganic particles either conductive or not, is preferably used in such an amount that the ratio of total weight of solid binder components/total weight of the composition ranges from 0.1 to 80%, preferably from 1 to 40%.

The curable composition of the invention optionally comprises a catalytic amount of at least one curing catalyst, so as to accelerate the curing step.

Examples of curing catalysts are aluminum acetylacetonate, carboxylates of metals such as zinc, titanium, zirconium, tin or magnesium.

Condensation catalysts such as saturated or unsaturated polyfunctional acids or acid anhydrides may also be used, in particular maleic acid, itaconic acid, trimellitic acid or trimellitic anhydride. Numerous examples of curing and/or condensation catalysts are given in "Chemistry and Technology of the Epoxy Resins", B. Ellis (Ed.) Chapman Hall, New York, 1993 and "Epoxy Resins Chemistry and Technology" $2^{eme}$ edition, C. A. May (Ed.), Marcel Dekker, New York, 1988.

In general, the catalysts described above are used according to the invention in an amount ranging from 0.01 to 10%, preferably from 0.1 to 5% by weight based on the total weight of the curable composition.

The curable composition according to the invention may also contain various additives conventionally used in polymerizable compositions, in conventional proportions. These additives include stabilizers such as antioxidants, UV light absorbers, light stabilizers, anti-yellowing agents, adhesion promoters, dyes, photochromic agents, pigments, rheology modifiers, lubricants, ionic or non ionic surfactants, photo-initiators fragrances, and deodorants, doping agents such as organic acids, pH regulators (particularly in the case of conductive polymer, agents such as polypyrroles or polyanilines). They should neither decrease the effectiveness of the conductive polymer nor deteriorate optical properties of the article.

The remaining of the curable composition is essentially comprised of solvents. Solvents may be chosen from water or water-miscible alcohols, essentially ethanol, or mixtures of water and water-miscible alcohols. Generally, the curable coating composition of the invention contains water, preferably deionized water or a solvent as a mixture of water/water miscible solvent. Among useful water miscible solvents may be cited the following alcohols: methanol, ethanol, n-propanol, isopropanol, n-butanol, isobutanol, sec-butanol, tert-butanol, n-amylic alcohol, isoamylic alcohol, sec-amylic alcohol, tert-amylic alcohol, 1-ethyl-1-propanol, 2-methyl-1-butanol, 1-methoxy-2-propanol n-hexanol, cyclohexanol, ethyl cellosolve (monoethoxy ethylene glycol), and ethylene glycol. It is also possible to add an appropriate amount of another hydrophilic organic solvent in said composition in order to improve the dissolution of the conductive polymer, or increase compatibility of the optional binder with the composition. To this end, organic solvents such as N-methylpyrrolidin-2-one (NMP), acetone, triethylamine or dimethylformamide (DMF) may be employed, without being limited to this solvent list. However, the antistatic coating composition preferably only comprises environmentally benign solvents, such as water or ethanol.

The curable coating composition according to the invention generally has a dry extract (ratio of total weight of solid compounds after evaporation of solvents/total weight of the composition) lower than 80%, preferably ranging from 0.2 to 50%, even better from 1 to 30%.

The curable composition according to the invention may be deposited onto at least part of a main face of the substrate of the optical article, preferably onto said entire main face, by any of the methods used in coating technology such as, for example, spray coating, spin coating, flow coating brush coating, dip coating or roll-coating. Spin coating or dip coating is the preferred method. The composition can also be applied by a series of successive layers or thin coats onto the substrate to achieve the desired thickness.

Articles obtained according to the invention will be now described in more details.

The present invention provides optical articles having charge decay times ≤500 milliseconds, preferably ≤200 milliseconds and better ≤150 milliseconds.

The final optical articles preferably do not absorb light in the visible range (or little), which means herein that when coated on one side according to the inventive process, the optical article has a luminous absorption in the visible range due to the anti reflecting (AR) and antistatic (AS) coatings of preferably 1% or less, more preferably less than 1%, and/or a relative light transmission factor in the visible spectrum, Tv, preferably higher than 90%, more preferably higher than 95%, and even more preferably higher than 96%. Preferably, both features are simultaneously satisfied and can be reached by carefully controlling thicknesses of the coatings.

As used herein, the Tv factor is such as defined in the standard NF EN 1836 and corresponds to the 380-780 nm wavelength range.

In an alternative embodiment, the optical article may be tinted or dyed and absorb light in the visible range.

The final optical articles prepared according to the invention preferably have low haze characteristics. Haze is a measurement of the transmitted light scattered more than 2.5° from the axis of the incident light. The smaller the haze value, the lower the degree of cloudiness. The haze value of the present optical articles is preferably less than 0.8%, and more preferably less than 0.5%.

The substrate may be made of mineral glass or organic glass, preferably organic glass (polymer substrate). The organic glasses can be made of any material currently used for organic ophthalmic lenses, e.g., thermoplastic materials such as polycarbonates and thermoplastic polyurethanes or thermosetting (cross-linked) materials such as those obtained by polymerization of allyl derivatives such as the allyl carbonates of linear or branched aliphatic or aromatic polyols, such as ethylene glycol bis(allyl carbonate), diethylene glycol bis (2-methyl carbonate), diethylene glycol bis(allyl carbonate), ethylene glycol bis(2-chloroallyl carbonate), triethylene glycol bis(allyl carbonate), 1,3-propanediol bis(allyl carbonate), propylene glycol bis(2-ethylallyl carbonate), 1,3-butenediol bis(allyl carbonate), 1,4-butenediol bis(2-bromoallyl carbonate), dipropylene glycol bis(allyl carbonate), trimethylene glycol bis(2-ethylallyl carbonate), pentamethylene glycol bis (allyl carbonate), isopropylene bisphenol-A bis(allyl carbonate), poly(meth)acrylates and copolymers based substrates, such as substrates obtained by the polymerization of alkyl methacrylates, in particular $C_1$-$C_4$ alkyl methacrylates such as methyl (meth)acrylate and ethyl (meth)acrylate, substrates comprising (meth)acrylic polymers and copolymers derived from bisphenol-A, polyethoxylated aromatic (meth)acrylates such as the polyethoxylated bisphenolate di(meth)acrylates, polythio(meth)acrylates, thermosetting polyurethanes, polythiourethanes, polyepoxides, polyepisulfides, as well as copolymers thereof and blends thereof.

Substrates particularly recommended are polycarbonates, for example those made from bisphenol-A polycarbonate, sold for example under the trade names LEXAN® by General Electric or MAKROLON® by Bayer AG, or those incorporating carbonate functional groups, in particular substrates obtained by polymerization or copolymerization of diethylene glycol bis(allyl carbonate), sold under the trade name CR-39® by PPG INDUSTRIES (ORMA® ESSILOR lens).

Among other recommended substrates are substrates obtained by polymerization of thio(meth)acrylic monomers, such as those disclosed in the French patent application FR 2734827.

The substrates may obviously be obtained by polymerizing mixtures of the above monomers. By (co)polymer, it is meant a copolymer or polymer. By (meth)acrylate, it is meant an acrylate or methacrylate.

Optionally, the substrate is coated with an impact-resistant primer coating. The impact-resistant primer coating which may be used in the present invention can be any coating typically used for improving impact resistance of a finished optical article. Also, this coating generally enhances adhesion, if present, of the antistatic abrasion resistant coating of the invention on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth) acrylic based coatings and polyurethane based coatings. (Meth)acrylic based impact-resistant coatings are, among others, disclosed in U.S. Pat. Nos. 5,015,523 and 6,503,631 whereas thermoplastic and cross-linked based polyurethane resin coatings are disclosed inter alia, in Japanese Pat. Nos. 63-141001 and 63-87223, EP Pat. No. 0404111 and U.S. Pat. No. 5,316,791.

In particular, the impact-resistant primer coating according to the invention can be made from a latex composition such as a poly(meth)acrylic latex, a polyurethane latex or a polyester latex.

Among the preferred (meth)acrylic based impact-resistant primer coating compositions there can be cited polyethylene glycol(meth)acrylate based compositions such as, for example, tetraethylene glycoldiacrylate, polyethylene glycol (200) diacrylate, polyethylene glycol (400) diacrylate, polyethylene glycol (600) di(meth)acrylate, as well as urethane (meth)acrylates and mixtures thereof.

Preferably the impact-resistant primer coating has a glass transition temperature (Tg) of less than 30° C. Among the preferred impact-resistant primer coating compositions, there may be cited the acrylic latex commercialized under the name Acrylic latex A-639 by Zeneca and polyurethane latexes commercialized under the names W-240 and W-234 by Baxenden Chemicals or Witcobond.

In a preferred embodiment, the impact-resistant primer coating may also include an effective amount of a coupling agent in order to promote adhesion of the primer coating to the optical substrate and/or to the coating deposited over it. Such kinds of coupling agents are described in U.S. Pat. No. 6,562,466 incorporated herein by reference. The impact-resistant primer coating composition can be applied onto the lens substrate using any classical method such as spin, dip, or flow coating.

The impact-resistant primer coating composition can be simply dried or optionally pre-cured before molding of the optical substrate. Depending upon the nature of the impact-resistant primer coating composition, thermal curing, UV-curing or a combination of both can be used.

Thickness of the impact-resistant primer coating, after curing, typically ranges from 0.05 to 30 μm, preferably 0.5 to 20 μm and more particularly from 0.6 to 15 μm, and even better 0.6 to 5 μm and most preferably 0.6 to 1.2 microns.

The surface of the article onto which the impact-resistant primer coating is deposited may optionally be subjected to a physical or chemical pre-treatment step intended to improve adhesion, for example a high-frequency discharge plasma treatment, a glow discharge plasma treatment, a corona treatment, an electron beam treatment, an ion beam treatment, a solvent treatment or an acid or base (NaOH) treatment.

According to a first embodiment of the invention, the antistatic coating composition is deposited on a substrate in a manner such that, after curing, it forms a thin antistatic coating, i.e. a coating having a thickness of less than 1 micrometer, preferably less than 700 nm, and better less than 500 nm.

According to a second embodiment of the invention, the antistatic coating composition is deposited on a substrate in a manner such that, after curing, it forms an abrasion resistant antistatic coating having a thickness of 1 micrometer or more, preferably from 1 to 100 micrometers, more preferably from 2 to 10 micrometers and better from 2.5 to 6 micrometers.

The first embodiment (thin antistatic coating) will be now described in more details.

The most preferred thicknesses for a thin antistatic coating according to the invention ranges from 50 to 500 nm.

As the layer is thin, it is possible to increase the concentration of the at least one conductive polymer in the curable antistatic composition in order to get the highest antistatic properties without significantly affecting the optical properties of the coating.

In this case, the content of the at least one conductive polymer in the dry extract of the curable coating composition of the invention preferably ranges from 0.5 to 5% and more preferably from 1.5 to 4% by weight, based on the total weight of the dry extract.

Also the respective weight ratio of [dry extract of conductive polymer in the coating composition]/[dry extract from said at least one epoxysilane in the coating composition] preferably ranges from 0.02 to 0.15, more preferably from 0.04 to 0.10.

The colloidal particles of said at least one non conductive oxide will have preferably a size ranging from 2 to 20 nm.

In this particular embodiment, the surface of the thin antistatic coating is preferably smooth (i.e. no significant roughness), that is to say that the antistatic coating has an outer surface which is not nanostructured.

In order to get the best abrasion properties, it is preferred that the thin antistatic coating be deposited over a coating providing additional abrasion resistance.

Accordingly, the article on which the thin antistatic coating is deposited has preferably been previously coated, before deposition of the curable composition of the invention which provides upon curing a the thin antistatic coating, with an outermost coating, said outermost coating being an abrasion resistant coating having a thickness of at least 1 μm, preferably of at least 2 microns, more preferably of at least 3 microns.

Any abrasion resistant coating known in the art may be used in this embodiment of the invention.

By definition, an abrasion (scratch) resistant coating is a coating which improves the abrasion resistance of the finished optical article as compared to a same optical article but without the scratch-resistant coating.

The abrasion resistant coating composition can be a UV and/or a thermal curable composition.

Preferred scratch-resistant coatings are those made by curing a precursor composition including epoxyalkoxysilanes or a hydrolyzate thereof, an inorganic filler(s) such as silica and a curing catalyst.

As epoxysilanes, the same epoxysilanes having at least two hydrolyzable groups, especially epoxysilanes of formula V or VI, as described above for the curable composition of the invention are preferably used in the abrasion resistant coating having a thickness of at least 1 µm.

Components of formula IX may also be used in the abrasion resistant coating, preferably as additional components.

Examples of abrasion resistant coating compositions are disclosed in EP 614957, U.S. Pat. No. 4,211,823, WO 94/10230, U.S. Pat. No. 5,015,523.

The most preferred scratch-resistant coating compositions are those comprising as the main constituents an epoxyalkoxysilane such as, for example, [gamma]-glycidoxypropyltrimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remaining of the composition being essentially comprised of solvents typically used for formulating these compositions in the art The abrasion resistant coating may also be a (meth)acrylate based coating, which is typically UV-curable. The term (meth)acrylate means either methacrylate or acrylate.

The main component of the (meth)acrylate based curable coating composition may be chosen from monofunctional (meth)acrylates and multifunctional (meth)acrylates such as difunctional (meth)acrylates; trifunctional (meth)acrylates; tetrafunctional (meth)acrylates, pentafunctional(meth)acrylates, hexafunctional (meth)acrylates.

Examples of monomers which may be used as main components of (meth)acrylate based coating compositions are:
 monofunctional (meth)acrylates: allyl methacrylate, 2-ethoxyethyl acrylate, 2-ethoxyethyl methacrylate, caprolactone acrylate, is obornyl methacrylate, lauryl methacrylate, polypropylene glycol monomethacrylate;
 difunctional (meth)acrylates: 1,4-butanediol diacrylate, 1,4-butanediol dimethacrylate, 1,6-hexanediol diacrylate, 1,6-hexanediol dimethacrylate, ethoxylated bisphenol A diacrylate, polyethylene glycol di(meth) acrylates such as polyethylene glycol diacrylate, tetraethylene glycol diacrylate, polyethylene glycol dimethacrylate, polyethylene glycol diacrylate, tetraethylene glycol diacrylate, tripropylene glycol diacrylate, neopentyl glycol diacrylate, tetraethylene glycol dimethacrylate, diethylene glycol diacrylate;
 trifunctional (meth)acrylates: trimethylolpropane trimethacrylate, trimethylolpropane triacrylate, pentaerythritol triacrylate, ethoxylated trimethylolpropane triacrylate, trimethylolpropane trimethacrylate; and
 tetra to hexa(meth)acrylates: dipentaerythritol pentaacrylate, pentaerythritol tetraacrylate, ethoxylated pentaerythritol tetraacrylate, pentaacrylate esters.

When the article comprises an impact resistant primer coating, the abrasion resistant coating is deposited onto this impact resistant primer coating.

The inventors have found that the coatings of the present invention provide antiabrasion and antistatic properties to an article even if layers having a significant thickness, i.e. over 50 nm and preferably less than 1 micron, are deposited onto it.

Thus a mono or multilayer antireflective coating comprising an outer layer may optionally be directly deposited over said antistatic thin coating.

Anti-reflection (AR) coatings and their methods of making are well known in the art. The AR coating of the present invention may include any layer or stack of layers which improves the anti-reflective properties of the finished optical article over at least one portion of the visible spectrum, thereby increasing the transmission of light and reducing surface reflectance at the article-air interface.

The AR coating may be a mono- or multilayered AR coating, and preferably comprises a mono- or multilayered film of dielectric materials.

Although the AR coating preferably comprises an alternated stack of low refractive index (LI) and high refractive index (HI) layers, in another embodiment of the invention, LI and HI layers are not necessarily alternated in the AR coating.

As used herein, a low refractive index layer is intended to mean a layer with a refractive index of 1.55 or less, preferably lower than 1.50 and even better lower than 1.45, and a high refractive index layer is intended to mean a layer with a refractive index higher than 1.55, preferably higher than 1.6, more preferably higher than 1.8 and even better higher than 2, both at a reference wavelength of 550 nm. Unless otherwise noted, all refractive indexes indicated in the present patent application are expressed at 25° C. and λ=550 nm.

HI layers are classical high refractive index layers and may comprise, without limitation, one or more mineral oxides such as $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nd_2O_5$, $HfO_2$, $Sc_2O_3$, $Pr_2O_3$ or $Al_2O_3$, or $Si_3N_4$, as well as mixtures thereof, preferably $TiO_2$ or $PrTiO_3$.

LI layers are also well known and may comprise, without limitation, $SiO_2$, $MgF_2$, $ZrF_4$, $AlF_3$, chiolite ($Na_3Al_3F_{14}$), cryolite ($Na_3[AlF_6]$), or mixtures thereof, preferably $SiO_2$ or $SiO_2$ doped with $Al_2O_3$.

Generally, HI layers have a physical thickness ranging from 10 to 120 nm, and LI layers have a physical thickness ranging from 10 to 100 nm.

Preferably, the total physical thickness of the AR coating is lower than 1 micrometer, more preferably lower than or equal to 500 nm and even better lower than or equal to 250 nm. The total physical thickness of the anti-reflection coating is generally higher than 100 nm, preferably higher than 150 nm.

The AR coating is generally applied by vacuum deposition according to one of the following techniques: i) by evaporation, optionally assisted by ion beam; ii) by ion-beam spraying; iii) by cathodic spraying; iv) by chemical vapor deposit assisted by plasma.

In addition to vacuum deposition, the AR coating can also be applied by depositing a liquid solution, preferably by a spin coating process. As an example, it is possible to apply an inorganic layer by the sol/gel route, for example from a tetraethoxysilane hydrolyzate.

In the case of a single layer film, its optical thickness is preferably equal to λ/4, where λ is a wavelength of 450 to 650 nm.

In the case of a multilayer film comprising three layers, a combination may be used corresponding to the respective optical thicknesses λ/4, λ/2, λ/4 or λ/4, λ/4, λ/4.

It is also possible to use an equivalent coating made up of more layers, instead of any number of the layers which are part of the above-mentioned three layers.

Preferably, the AR coating is a multilayer film comprising three or more dielectric material layers of alternatively high (HI) and low (LI) refractive indexes.

Optionally, the AR coating comprises a sub-layer. By "sub-layer" it is meant a coating which is generally employed for purposes of adhesion improvement or abrasion and/or scratch resistance improvement. In the present patent application, the AR coating comprises "AR layers" and optionally comprises a sub-layer. Said sub-layer is considered to be part of the AR coating, albeit it is not referred to as an "AR layer." It is interleaved, in the final optical article, between the substrate (either naked or coated) and the AR layers of the AR coating, i.e., those having a significant effect on the AR properties of the optical article. Sub-layers generally have a relatively high thickness, and consequently neither take part to the anti-reflective optical activity nor have a significant optical effect.

According to a specific embodiment, an anti-fouling top coat may be deposited over said outer layer of said antistatic coating.

The anti-fouling top coat is defined as a hydrophobic and/or oleophobic surface coating. The ones preferably used in this invention are those which reduce surface energy of the article to less than 20 mJ/m$^2$. The invention has a particular interest when using anti-fouling top coats having a surface energy of less than 14 mJ/m$^2$ and even better less than 12 mJ/m$^2$.

The surface energy values referred above are calculated according to Owens Wendt method, described in the following document: Owens, D. K.; Wendt, R. G. "Estimation of the surface force energy of polymers", J. Appl. Polym. Sci. 1969, 51, 1741-1747.

The anti-fouling top coat according to the invention is preferably of organic nature. By organic nature, it is meant a layer which is comprised of at least 40% by weight, preferably at least 50% by weight of organic materials, relative to the total weight of the coating layer. A preferred anti-fouling top coat is made from a liquid coating material comprising at least one fluorinated compound.

Hydrophobic and/or oleophobic surface coatings most often comprise silane-based compounds bearing fluorinated groups, in particular perfluorocarbon or perfluoropolyether group(s). By way of example, silazane, polysilazane or silicone compounds are to be mentioned, comprising one or more fluorine-containing groups such as those mentioned above. Such compounds have been widely disclosed, for example in U.S. Pat. No. 4,410,563, EP 0203730, EP 749021, EP 844265 and EP 933377.

A classical method to form an anti-fouling top coat consists of depositing compounds bearing fluorinated groups and Si—R groups, R representing an —OH group or a precursor thereof, such as —Cl, —NH$_2$, —NH— or —O-alkyl, preferably an alkoxy group. Such compounds may perform, at the surface onto which they are deposited, directly or after hydrolysis, polymerization and/or cross-linking reactions with pendent reactive groups.

Preferred fluorinated compounds are silanes and silazanes bearing at least one group selected from fluorinated hydrocarcarbons, perfluorocarbons, fluorinated polyethers such as F$_3$C—(OC$_3$F$_6$)$_{24}$—O—(CF$_2$)$_2$—(CH$_2$)$_2$—O—CH$_2$—Si(OCH$_3$)$_3$ and perfluoropolyethers, in particular perfluoropolyethers.

Among fluorosilanes there may be cited the compounds of formulae:

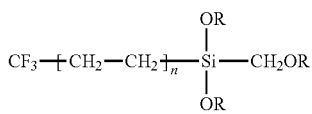

wherein n=5, 7, 9 or 11 and R is an alkyl group, typically a C$_1$-C$_{10}$ alkyl group such as methyl, ethyl and propyl;

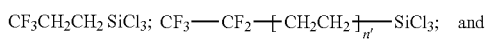

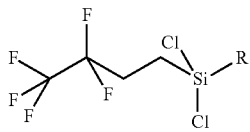

wherein n'=7 or 9 and R is as defined above.

Compositions containing fluorosilanes also useful for making hydrophobic and/or oleophobic top coats are disclosed in U.S. Pat. No. 6,183,872. Such compositions comprise silicon-containing organic fluoropolymers represented by the below general formula and having a number average molecular weight of 5×10$^2$ to 1×10$^5$.

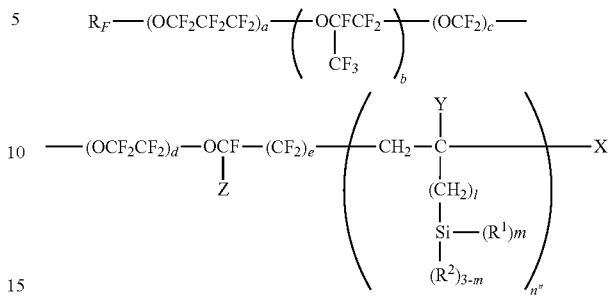

wherein R$_F$ represents a perfluoroalkyl group, Z represents a fluorine atom or a trifluoromethyl group, a, b, c, d and e each independently represent 0 or an integer equal to or higher than 1, provided that a+b+c+d+e is not less than 1 and the order of the repeating units parenthesized by subscripts a, b, c, d and e occurring in the above formula is not limited to that shown; Y represents a hydrogen atom or an alkyl group containing 1 to 4 carbon atoms; X represents a hydrogen, bromine or iodine atom; R$^1$ represents a hydroxyl group or a hydrolyzable substituent group; R$^1$ represents a hydroxyl group or a hydrolyzable substituent group; R$^2$ represents a hydrogen atom or a monovalent hydrocarbon group; l represents 0, 1 or 2; m represents 1, 2 or 3; and n" represents an integer equal to or higher than 1, preferably equal to or higher than 2.

Other preferred compositions for forming the hydrophobic and/or oleophobic surface coating are those containing compounds comprising fluorinated polyether groups, in particular perfluoropolyether groups. A particular preferred class of compositions containing fluorinated polyether groups is disclosed in U.S. Pat. No. 6,277,485. The anti-fouling top coats of U.S. Pat. No. 6,277,485 are at least partially cured coatings comprising a fluorinated siloxane prepared by applying a coating composition (typically in the form of a solution) comprising at least one fluorinated silane of the following formula:

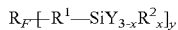

wherein R$_F$ is a monovalent or divalent polyfluoro polyether group; R$^2$ is a divalent alkylene group, arylene group, or combinations thereof, optionally containing one or more heteroatoms or functional groups and optionally substituted with halide atoms, and preferably containing 2 to 16 carbon atoms; R$^2$ is a lower alkyl group (i.e., a C$_1$-C$_4$ alkyl group); Y is a halide atom, a lower alkoxy group (i.e., a C$_1$-C$_4$ alkoxy group, preferably, a methoxy or ethoxy group), or a lower acyloxy group (i.e., —OC(O)R$^3$ wherein R$^3$ is a C$_1$-C$_4$ alkyl group); x is 0 or 1; and y is 1 (R$_F$ is monovalent) or 2 (R$_F$ is divalent). Suitable compounds typically have a molecular weight (number average) of at least about 1000. Preferably, Y is a lower alkoxy group and R$_F$ is a perfluoro polyether group.

Commercial compositions for making anti-fouling top coats are the compositions KY130 and KP 801M commercialized by Shin-Etsu Chemical and the composition OPTOOL DSX (a fluorine-based resin comprising perfluoropropylene moieties) commercialized by Daikin Industries. OPTOOL DSX is the most preferred coating material for anti-fouling top coats.

The liquid coating material for forming the anti-fouling top coat of the invention may comprise one or more of the above cited compounds. Preferably, such compounds or mixtures of compounds are liquid or can be rendered liquid by heating, thus being in a suitable state for deposition.

The deposition techniques for such anti-fouling top coats are very diverse, including liquid phase deposition such as dip coating, spin coating (centrifugation), spray coating, or vapor phase deposition (vacuum evaporation). Of which, deposition by spin or dip coating is preferred.

If the anti-fouling top coat is applied under a liquid form, at least one solvent is added to the coating material so as to prepare a liquid coating solution with a concentration and viscosity suitable for coating. Deposition is followed by curing.

In this connection, preferred solvents are fluorinated solvents and alcohols such as methanol, preferably fluorinated solvents. Examples of fluorinated solvents include any partially or totally fluorinated organic molecule having a carbon chain with about 1 to about 25 carbon atoms, such as fluorinated alkanes, preferably perfluoro derivatives and fluorinated ether oxides, preferably perfluoroalkyl alkyl ether oxides, and mixtures thereof. As a fluorinated alkane, perfluorohexane ("Demnum" from DAIKIN Industries) may be used. As a fluorinated ether oxide, methyl perfluoroalkyl ethers may be used, for instance methyl nonafluoro-isobutyl ether, methyl nonafluorobutyl ether or mixtures thereof, such as the commercial mixture sold by 3M under the trade name HFE-7100. The amount of solvent in the coating solution preferably ranges from 80 to 99.99% in weight.

Generally, the deposited anti-fouling top coat has a physical thickness lower than 30 nm, preferably ranging from 1 to 20 nm, more preferably ranging from 1 to 10 nm, and even better from 1 to 5 nm. Control of the deposited thickness can be performed by means of a quartz scale.

The anti-fouling top coat used herein may be used to improve dirty mark resistance of the finished article, which is particularly useful for optical articles. Reducing the surface energy avoids the adhesion of fatty deposits, such as fingerprints, sebum, sweat, cosmetics, which are thus easier to remove.

In an alternative embodiment, the antifouling layer as described above may be deposited using the same process as described above on the outer layer of the optional antireflective layer/antistatic coating layer, thereby obtaining an antistatic antireflective abrasion resistant article exhibiting antistatic and antifouling properties.

In another embodiment of the invention relating to a thin antistatic abrasion resistant coating, the size of the particles of the non conductive oxide colloid and/or the ratio of non conductive oxide colloid/binder in the curable coating composition of the invention is/are chosen in order to confer a roughness to the surface of said antistatic coating.

Preferably, the roughness is such that the RMS surface roughness of the film ranges from 5 to 50 nm, more preferably from 10 to 30 nm and even more preferably from 10 to 20 nm.

RMS roughness is defined as the Root Mean Square deviation (peaks and valleys) of the surface from the mean surface level.

Roughness measurements may be determined using a scanning probe microscope from Burleigh Instruments, Inc. (AFM, precision: ±1 nm). Burleigh Vista AFM collects topography images in AC mode (tapping mode) controlled by Image Studio 4.0 software. Image data collection is in a 5 μm x 5 μm scanning area taken at a 1.5 Hz scan rate. Using Mountains Map Hi 4.0.2 software, the data is leveled and scanned artifacts are removed, then Sq, the effective RMS roughness parameter, is automatically calculated by the software.

There are several options to increase roughness as identified below.

1—The binder and the at least one non conductive oxide are in said antistatic coating in an amount such that the weight ratio of binder/colloidal particles of non conductive oxide ranges from 2:1 to 1:15, preferably from 1:1 to 1:15, more preferably from 1:1.1 to 1:10, and even better from 1:1.2 to 1:10. This corresponds with a high ratio implying that the colloidal particles of non conductive oxide are not fully embedded in the binder.

2—The binder in the coating composition is in an amount ranging from 0.5 to 4% by weight, preferably 0.8 to 3% by weight and more preferably 1 to 2% by weight, relative to the total weight of the coating composition.

3—The colloidal particles of the at least one non conductive oxide are in an amount ranging from 1 to 15%, preferably from 1 to 10%, and more preferably from 2 to 8% by weight relative to the total weight of the curable composition.

4—The colloidal particles of said at least one non conductive oxide have a size ranging from 40 to 150 nm, preferably 50 to 150 nm, i.e., particles having a sufficient size to create the roughness.

Obviously, it is possible to combine two or more of the options mentioned above in order to increase the final roughness.

Then an antifouling top coat as defined previously is deposited directly over said antistatic coating having surface roughness, i.e. the nanostructured layer of nanoparticles is then at least partially coated with the anti-fouling top coat material. In one embodiment, the entire surface of the layer comprising nanoparticles and binder is fully covered with the anti-fouling top coat.

The article thus obtained exhibit ultra hydrophobic properties along with antistatic properties and abrasion resistance.

Ultra hydrophobic property is defined as the property of a surface whose static contact angle with water (water contact angle or WCA) is ≥115°.

In general, the outer surface of said antifouling top coat exhibits a static water contact angle ranging from 115° to 160°, preferably at least equal to 120° and better preferably at least equal to 125°.

Special care, however, must be taken so as to not suppress or considerably decrease the surface roughness created by the nanoparticles, which is necessary to obtain ultra high hydrophobic properties. The higher the RMS roughness, the rougher the surface and consequently the higher the WCA.

The amount of anti-fouling material deposited has to be chosen so as to keep WCA≥115°, i.e. to avoid suppressing the nanostructure of the AR coating.

Preferably, physical thickness of the ultrahydrophobic antistatic nanostructured film (nanoparticles layer(s)+antifouling top coat) is lower than 1 μm, more preferably in a range from 50 nm to 700 nm, and even better from 50 nm to 550 nm. The thickness of the layer encompasses the height of the nanoparticles.

In another embodiment a mono or multilayered antireflective coating as described above is deposited using the same process as described above onto said antistatic coating having surface roughness.

Preferably, the total physical thickness of the AR coating is 1 micrometer or less, more preferably lower than 1 micrometer, better lower than 700 nm, more preferably in a range from more than 50 nm to 500 nm. The total physical thickness of the AR coating is generally higher than 100 nm, preferably higher than 150 nm.

As the antireflective layer is thin, the roughness is transferred at the surface of the antireflective coating.

Preferably, the outer layer of the mono or multilayer antireflective coating has a RMS surface roughness of the film ranging from 5 to 50 nm, preferably from 10 to 30 nm and more preferably from 10 to 20 nm.

Thus, the same antifouling material having the same features as described previously is deposited using the same process as above onto the outer layer of the antireflective surface.

An article having antireflective properties, abrasion resistance and exhibiting antistatic properties along with ultrahydrophobic properties is thus obtained.

According to another embodiment of the present invention, the antistatic coating composition is deposited and cured to form a layer having a thickness higher than 1 micrometer, preferably from 1 to 50 micrometers. Then the curable antistatic coating of the present invention is able to provide only by itself a very high level of abrasion resistance.

Preferably the thickness of the curable antistatic coating composition ranges from 1 to 15 micrometers, and more preferably from 1.5 to 10, better from 2 to 6 micrometers, even better from 2.5 to 6 micrometers.

Preferably, the solid content of said at least one conductive polymer in the dry extract of said curable composition ranges from 0.1 to 2% by weight, preferably from 0.3 to 1% by weight, based on the total weight of the dry extract.

The colloidal particles of said at least one non conductive oxide have a size ranging from 2 to 20 nm.

The antistatic coating having a thickness higher than 1 micrometer may be deposited on a substrate comprising an outer impact resistant primer which may be the same as the one defined previously.

In another embodiment, a multilayer antireflective coating and/or an anti-fouling top coat is deposited over said antistatic coating.

The antireflective coating may be the same as the antireflective coating defined above in the case of the thin antistatic coating.

The anti-fouling top coat may be the same as defined above in the case of the thin antistatic coating.

Whatever the embodiment of the present invention, the antistatic abrasion resistant coating of the invention shows many advantages compared to other antistatic coating systems, including:
1) it may be processed simply and with a low temperature (~100° C.) process;
2) it is applicable to most substrates with excellent adhesion;
3) it has excellent abrasion resistance;
4) it is possible to use an environmentally friendly solvent, such as an alcohol or a water/alcohol cosolvent;
5) it allows for a flexible process to make other functional coatings;
6) furthermore, when the antistatic hard coating is coated with AR stacks and a DSX top coat, the resulting coating still maintain antistatic properties, high optical transparency, low haze and ultra hydrophobicity.

The antistatic hard coating has specific applications in the optical lens industry, especially for ophthalmic lens but it may be used in other industries, such as photographic films, electronics packaging and imaging materials.

Now, the present invention will be described in more detail with reference to the following examples. These examples are provided only for illustrating the present invention and should not be construed as limiting the scope and spirit of the present invention The following test procedures were used to evaluate the optical articles prepared according to the present invention.

a) Charge decay time

In the present patent application, charge decay times of optical articles which have been beforehand subjected to a corona discharge at 900 volts were measured using JCI 155v5 Charge Decay Test Unit from John Chubb Instrumentation at 25° C. and 50% relative humidity.

The unit was set up with JCI 176 Charge Measuring Sample Support, JCI 191 Controlled Humidity Test Chamber, JCI 192 Dry Air Supply Unit and Calibration of voltage sensitivity and decay time measurement performance of JCI 155 v5 (from John Chubb Instrumentation) to the methods specified in British Standard and Calibration voltage measurements and resistor and capacitor values traceable to National Standards.

b) Dry Adhesion test

Dry adhesion of the transferred coatings was measured using the cross-hatch adhesion test according to ASTM D3359-93, by cutting through the coatings a series of 5 lines, spaced 1 mm apart with a razor, followed by a second series of 5 lines, spaced 1 mm apart, at right angles to the first series, forming a crosshatch pattern comprising 25 squares. After blowing off the crosshatch pattern with an air stream to remove any dust formed during scribing, clear cellophane tape (3M SCOTCH® no. 600) was then applied over the crosshatch pattern, pressed down firmly, and then rapidly pulled away from coating in a direction perpendicular to the coating surface. Application and removal of fresh tape was then repeated two additional times. Adhesion as depicted below was is rated as follows: 0 was is the best adhesion, 1-4 was is in the middle, and 5 was the poorest adhesion),

| Adhesion score | Squares removed | Area left intact (%) |
| --- | --- | --- |
| 0 | 0 | 100 |
| 1 | <1 | >96 |
| 2 | 1 to 4 | 96-84 |
| 3 | >4 to 9 | 83-64 |
| 4 | >9 to 16 | 63-36 |
| 5 | >16 | <36 | c) Haze value and Tv

The haze value of the final optical article was measured by light transmission utilizing the Haze-Guard Plus haze meter from BYK-Gardner (a color difference meter) according to the method of ASTM D1003-00, which is incorporated herein in its entirety by reference. All references to "haze" values in this application are by this standard. The instrument was first calibrated according to the manufacturer's instructions. Next, the sample was placed on the transmission light beam of the pre-calibrated meter and the haze value was recorded from three different specimen locations and averaged. Tv was measured using the same device.

"Luminous transmittance" or "relative light transmission factor in the visible spectrum" Tv (or $\zeta v$) is also defined in the standard ISO 13666:1998 and is measured according to the standard ISO 8980-3 (from 380 to 780 nm).

d) Bayer Abrasion test (with alumina) (will be referred as ISTM Bayer): Bayer abrasion resistance was determined by measuring the percent haze of a coated and uncoated lens, before and after testing on an oscillating sand abrader as in ASTM F 735-81. The abrader was oscillated for 300 cycles with approximately 500 g of aluminum oxide ($Al_2O_3$) ZF 152412 supplied by Specially Ceramic Grains (former Norton Materials) New Bond Street, PO Box 15137 Worcester, Mass. 01615-00137. The haze was measured using a Pacific Scientific Hazemeter model XL-211. The ratio of the uncoated lens haze (final-initial) was a measure of the performance of the coating, with a higher ratio meaning a higher abrasion resistance.

e) Wet cloth rubbing test: rubbing was performed by a rubbing machine from Eberbach Corporation, in which a water-wet cloth (tissue type cotton TWILLX 1622) was rubbed on the surface of the lens for 50 times without applying additional weight. The water contact angle (WCA) data before and after the rubs were reported.

f) Thickness of the films was evaluated by ellipsometer.

g) Contact angle data were collected by FTA200 (First Ten Angstrom) equipment, using a 4 μL liquid water drop.

h) Hand Steel wool (HSW):

The HSW test was implemented on the convex side of the lens only.

Lens was abraded with a steel wool perpendicularly to the direction of the fibers by performing 5 back and forth motions (with an amplitude from 4 to 5 cm) keeping an index finger with constant pressure on the steel wool.

Strength pressed on the steel wool was evaluated with a balance by fixing the lens on the balance plate with adhesive tape and pressing down the lens with the index finger exercising normal strength on the lens. This strength was about 5 Kg during the first way and about 2.5 Kg during the return way.

Lenses were visually inspected and noted according to the table below.

The higher the note, the more abraded the lens.

| Risk grid of for "Crizal" type product: | | | |
|---|---|---|---|
| Product Behavior | Low resistance | Acceptable area | Good resistance |
| Risk level | High | Acceptably | Low |
| Note | 5 | 3 | 1 |

The higher the note, the more abraded the lens.

EXAMPLES

Coating compositions for thin antistatic abrasion resistant coatings were prepared and all applied on Airwear™ lenses (polycarbonate lenses) which were already coated by an abrasion resistant hard coat.

The final lenses have an antistatic thin abrasion resistant hard coat deposited on a hard abrasion resistant coating.

The protocol for applying and curing the curable coating compositions of the invention was the following.

A lens substrate was first corona-treated and spin-coated from a Baytron P®-based mixture solution with the rotation speeds of 500 rpms for 5 seconds and 1000 rpms for 8 seconds, followed by a pre-cure process performed at 80° C. for 5 minutes and a post-cure process performed at 100° C. for 3 hours.

In some cases, the AR stacks plus a fluorinated topcoat were then vacuum-deposited onto the coated lens surface.

Examples 1 and 2

Coating compositions were prepared by mixing Glymo and HCl in methanol under agitation for 12 hours, then dispersing with $SiO_2$ nanoparticles (15 nm), Baytron P® solution, 1-butanol, Al(AcAc)$_3$, and a surfactant (FC-430). Two examples of antistatic curable composition are depicted in Table 1. These compositions are mainly composed of Glymo and Baytron P® in variable concentrations and $SiO_2$ nanoparticles in a fixed concentration. The diameter of the particles was 15 nm.

TABLE 1

| Coating compositions | 1A | 1B |
|---|---|---|
| Binder (Glymo), g | 2.00 | 1.00 |
| 0.1N HCl, g | 0.46 | 0.23 |
| SiO$_2$ (water based) (15 nm) 20 wt %*, g from Silco | 10.00 | 10.00 |
| Baytron P solution, g | 10.00 | 5.00 |
| 1-butanol g | 0.34 | 0.17 |
| Al(AcAc)$_3$, g | 0.14 | 0.07 |
| Surfactant FC-430, g | 0.01 | 0.005 |
| Methanol, g | 77.05 | 83.525 |

*SiO$_2$ liquid composition with a 20% by weight of dry content (solid content)

The substrate onto which the coating composition was deposited was an Airwear™ Essilor lens substrate which was already coated by an abrasion resistant hard coating based on an epoxysilane hydrolyzate. The thickness of this hard coating was 4 to 6 micrometers.

The Airwear™ Essilor lens substrate (power: plano lens, no power; diameter: 70 mm) was first corona-treated on the front side only. Then the lens substrate was spin-coated on the front convex side with one of the above described coating solutions, followed with a pre-cure process performed at 80° C. for 5 minutes and a post-cure process performed at 100° C. for 3 hours.

The performance test data of the final coated lenses are provided in Table 2.

TABLE 2

| Example | Coating compositions | Thickness (nm) | Tv (%) | Haze % | Dry adh. | Decay time (ms) | ISTM Bayer | HSW |
|---|---|---|---|---|---|---|---|---|
| 1 | 1A | 112 | 91.6 | 0.19 | 0 | 78.1 | 6.58 | 3 |
| 2 | 1B | 63.3 | 91.7 | 0.12 | 0 | 93.2 | 7.04 | 5 |
| Comp 1 Airwear ™ | — | / | 92.0 | 0.10 | 0 | 2.590 | 4.65 | 3 |

Dry adh. is short for "crosshatch dry adhesion test", 0 is the best adhesion, and 5 is the poorest adhesion.

Compared to the reference sample Airwear™ (Comparative example 1), the coated articles showed antistatic properties with short decay time (<100 ms). At the same time the coated articles maintained excellent adhesion to the underlying coating (crosshatch test 0), high transmittance (higher than 91%) and low haze (<0.2%) and improved abrasion resistance.

Examples 3 to 5

Coating compositions were prepared by mixing Glymo and HCl in methanol under agitation for 12 hours, then dispersing with SiO$_2$ nanoparticles (size of the particles was 45 nm), Baytron P® solution, 1-butanol, Al(AcAc)$_3$, and a surfactant (FC-430). Three examples of coating compositions are depicted in Table 3. These compositions are mainly composed of Glymo and $SiO_2$ nanoparticles in fixed concentrations and Baytron P® in a variable concentration.

TABLE 3

| Coating compositions | 2A | 2B | 2C |
|---|---|---|---|
| Binder (Glymo), g | 2.00 | 2.00 | 2.00 |
| 0.1N HCl, g | 0.46 | 0.46 | 0.46 |
| $SiO_2$ (45 nm) 20 wt %*, g water based, from Silco | 10.00 | 10.00 | 10.00 |
| Baytron P solution, g | 10.00 | 8.00 | 5.00 |
| 1-butanol, g | 0.34 | 0.34 | 0.34 |
| Al(AcAc)₃, g | 0.14 | 0.14 | 0.14 |
| Surfactant FC-430, g | 0.01 | 0.01 | 0.01 |
| Methanol, g | 77.05 | 79.05 | 82.05 |

*solid content in weight

The Airwear™ Essilor lens substrates were first corona-treated. Then each convex lens substrate was spin-coated with one of the above described coating compositions, followed by a pre-cure process performed at 80° C. for 5 minutes and a post-cure process performed at 100° C. for 3 hours.

The performance test data of the final coated lenses are provided in Table 4.

TABLE 4

| Example | Example coating compositions | Tv (%) | Haze % | Dry adh. | Decay time (ms) | ISTM Bayer | HSW |
|---|---|---|---|---|---|---|---|
| 3 | 2A | 91.9 | 0.39 | 0 | 72.2 | 6.57 | 3 |
| 4 | 2B | 91.9 | 0.21 | 0 | 97.3 | 6.39 | 3 |
| 5 | 2C | 92.0 | 0.23 | 0 | 118 | 6.06 | 3 |

Compared with the reference sample Airwear™ (Comparative example 1, Table 1), the coated articles exhibited antistatic properties with short decay time (<150 ms) and maintained excellent adhesion to the underlying coating (crosshatch test 0), with high transmittance (close to 92%), low haze (<0.5%) and improved abrasion resistance.

Examples 6 and 7

Coating solutions were prepared by mixing Glymo and HCl in methanol under agitation for 12 hours, then dispersing with $SiO_2$ water based nanoparticles (100 nm), Baytron P solution, 2-butanone, Al(AcAc)₃, and a surfactant (FC-430). Two examples of antistatic curable coating compositions are provided in Table 5.

These coating compositions are mainly composed of Glymo and $SiO_2$ nanoparticles in fixed concentrations and Baytron P® in a variable concentration.

TABLE 5

| Coating compositions | 3A | 3B |
|---|---|---|
| Binder (Glymo), g | 2.00 | 2.00 |
| 0.1N HCl, g | 0.46 | 0.46 |
| SiO2 (100 nm) 40 wt %*, g from Silco | 5.00 | 5.00 |
| Baytron P solution, g | 10.00 | 8.00 |
| 2-butanone, g | 0.34 | 0.34 |
| Al(AcAc)₃, g | 0.14 | 0.14 |
| Surfactant FC-430, g | 0.01 | 0.01 |
| Methanol, g | 82.05 | 84.05 |

*solid weight content

The Airwear™ Essilor lens substrates were first corona-treated. Then the convex surface of the lens substrates were spin-coated with one of the above described coating solutions, followed by a pre-cure process performed at 80° C. for 5 minutes and a post-cure process performed at 100° C. for 3 hours.

TABLE 6

| Example | Coating composition | Decay time (ms) | Tv (%) | Haze % | Dry adh. | ISTM Bayer | HSW |
|---|---|---|---|---|---|---|---|
| 6 | 3A | 67.4 | 91.6 | 0.34 | 0 | 6.09 | 5 |
| 7 | 3B | 99.6 | 91.8 | 0.22 | 0 | 6.15 | 3 |

Compared with the reference sample Airwear™, the coated articles exhibited antistatic properties with short decay time (<150 ms), excellent adhesion to the underlying coating, high transmittance (close to 92%), low haze (<0.5%) and excellent abrasion resistance.

Examples 8 to 10

Airwear™ Essilor lens substrates were first corona-treated. Then each of the convex surface of the lens substrates was spin-coated with one of the above described coating solutions 1A, 2A and 3A described previously, followed with a pre-cure process at 80° C. for 5 minutes and post-cure at 100° C. for 3 hours. Then these coating samples were vacuum deposited respectively with AR stack 1: $ZrO_2$(55 nm)/$SiO_2$ (30 nm)/$ZrO_2$(160 nm)/$SiO_2$(120 nm) and a fluorinated material OF110, acting as top coat. Table 7 shows the performance test data of these samples (Comparative example 2 is the reference lens Airwear™ coated with the same AR stack as examples 8 to 10 and OF110 in the same deposition conditions).

Comparative example 2 had no antistatic coating.

TABLE 7

| Examples | Coating composition | AR | Top coat | Tv % | Haze % | Decay time (ms) | Dry adh. | ISTM Bayer | HSWI |
|---|---|---|---|---|---|---|---|---|---|
| 8 | 1A | Yes | Yes | 96.8 | 0.16 | 108 | 0 | 4.79 | 3 |
| 9 | 2A | Yes | Yes | 96.3 | 0.25 | 82.5 | 0 | 5.10 | 3 |
| 10 | 3A | Yes | Yes | 97.1 | 0.32 | 81.2 | 0 | 5.28 | 3 |
| Comp Ex 2 | — | Yes | Yes | 97.6 | 0.13 | 1,760 | 0 | 4.78 | 3 |

The above example films showed high transmittance to about 96-97%, good antistatic properties having short decay time (<150 ms), excellent adhesion to the underlying coating, low haze (<0.5%) and good abrasion resistance.

In the following examples, an antifouling top coat was applied onto the surface of the antistatic thin abrasion resistant coating.

Examples 11 to 15

The coating compositions 2A, 2B and 2C and 3A, 3B as described previously (see Tables 3 and 5) were used in these examples.

An Airwear™ Essilor lens substrate was first corona-treated. Then the convex surface of the lens substrate was spin-coated with one of the above described coating solutions, followed with a pre-cure process at 80° C. for 5 minutes and post-cure at 100° C. for 3 hours. Then a fluorinated material OF110 was vacuum-deposit on the top to achieve hydrophobic properties.

Table 8 shows the performance test data of coated articles before and after vacuum deposition of an OF110 layer (Comp Ex 3 is an Airwear™ lens coated with OF110 in the same conditions as examples 11 to 13).

TABLE 8

| Example | Coating composition | Decay time (s) | WCA (°) | WCA# (°) |
|---|---|---|---|---|
| 11 | 2A | 0.0937 | 118 | 116 |
| 12 | 2B | 0.127 | 116 | 116 |
| 13 | 2C | 0.135 | 115 | 115 |
| 14 | 3A | 102 | 126 | 124 |
| 15 | 3B | 117 | 125 | 125 |
| Comp Ex3 | | 2.86 | 109 | 108 |

The static water contact angle measurements after abrasion tests (wet cloth rubbing for 50 times)

Compared with the reference sample Comp Ex3 (Airwear™), the coated articles showed antistatic properties with short decay time (<150 ms), ultra hydrophobicity (static contact angle data was higher than Comp Ex3), and maintained excellent adhesion to the underlying coating (crosshatch test 0), with high transmittance (close to or higher than 92%) and low haze (<0.5%). After vacuum deposition of the OF110 layer, the coated articles presented ultra hydrophobicity (static water contact angle data was higher than the reference sample).

After wet cloth rubbing for 50 times the OF110-coated articles almost didn't change their static water contact angle data, indicating the excellent abrasion resistance.

After wet cloth rubbing for 50 times the OF110-coated articles almost didn't change their static water contact angle data, indicating the excellent abrasion resistance.

The following examples describe articles coated with antistatic abrasion resistant coatings having thicknesses equal to or greater than 1 micrometer.

General Procedures

The general protocol is described below.

I. A lens substrate was first treated with a corona discharge or caustic solution.

II. In some cases, the lens was dip coated with one latex layer W234 (primer) from Baxenden and pre-cured at 75° C. for 5-30 minutes; the thickness of the cured latex layer was about 1 micrometer.

III. Then the lens was spin-coated with an antistatic coating composition according to the invention, followed by a pre-cure process performed at 75° C. for 5 minutes and a post-cure process performed at 100° C. for 3 hours.

IV. In some cases, both sides of the lens coated as described above were vacuum-deposited with an AR stack 1 in the following order from the lens substrate (optical thicknesses): $ZrO_2$(55 nm)/$SiO_2$(30 nm)/$ZrO_2$(160 nm)/$SiO_2$ (120 nm)) and had a Optool DSX™ top coat.

Liquid antistatic coating compositions were prepared by mixing Glymo and HCl in methanol under agitation for 12 hours, then dispersing with $SiO_2$ nanoparticles (100 nm), butanol, Al(AcAc)$_3$, and a surfactant (FC-430), and then adding hydrolyzed TEOS and Baytron P solution (in which sample 9 Ref was prepared without this step). Five antistatic examples and one static example of curable coating compositions are provided in Table 9.

TABLE 9

| Antistatic Coating Composition | 4 | 5 | 6 | 7 | 8 | 9 (Ref) |
|---|---|---|---|---|---|---|
| Glymo | 16.24 | 16.54 | 16.96 | 17.46 | 17.05 | 20.30 |
| 0.1NHCl | 3.68 | 3.75 | 3.84 | 3.96 | 3.86 | 4.60 |
| Silica 2034 (EKa Chemicals) | 23.08 | 23.51 | 24.1 | 24.81 | 24.23 | 28.85 |
| Methanol + butanol | 35.84 | 36.74 | 37.44 | 38.5 | 37.64 | 44.80 |
| Al(AcAc)$_3$ | >1 et <1.5 | >1 et <1.5 | >1 et <1.5 | >1 et <1.5 | >1 et <1.5 | >1 et <1.5 |
| FC-430 | 0.08 | 0.08 | 0.08 | 0.09 | 0.08 | 0.10 |
| H-TEOS | 8.00 | 7.90 | 5.97 | 4.00 | 8.20 | 0 |
| Baytron P | 12.00 | 10.60 | 10.48 | 10.00 | 7.81 | 0 |

H-TEOS (tetraethoxysilane) solution (40 wt % in methanol, hydrolyzed by 0.1N HCl)

Baytron P (1.3 wt % aqueous solution purchased from H. C. Starck/Bayer)

The reference liquid coating composition (comparative sample 9 Ref), and five coating compositions (samples 4-8) are disclosed in Table 9.

The respective ratios of Glymo, TEOS and Baytron P® in each liquid antistatic coating composition are disclosed in Table 10.

Ratio of Three Components (Glymo, TEOS and Baytron P)

TABLE 10

| Net wt % in coating compositions | 4 | 5 | 6 | 7 | 8 |
|---|---|---|---|---|---|
| Glymo | 16.24 | 16.54 | 16.96 | 17.46 | 17.05 |
| TEOS | 3.2 | 3.16 | 2.39 | 1.60 | 3.28 |
| Baytron P | 0.156 | 0.138 | 0.136 | 0.13 | 0.102 |
| Ratio | 104:21:1 | 120:23:1 | 125:18:1 | 134:12:1 | 167:32:1 |

Examples 16 to 20 and Comparative Example 4

The prepared lenses have the following structure:
Lens substrate/Antistatic (AS) hard coating.

An Orma® Essilor lens substrate was first treated with a corona discharge or caustic solution. Then the convex surface of the lens substrate was spin-coated with one of the liquid coating compositions (samples 4-8), followed by a pre-cure process performed at 75° C. for 5 minutes and a post-cure process performed at 100° C. for 3 hours. The performance test data of the coated lenses are provided in Table 11.

TABLE 11

| Example | Coating compo-sition | Tv % | Haze | Thickness (μm) of AS coating | Decay time (ms) | Bayer | HSW | Dry Adh |
|---|---|---|---|---|---|---|---|---|
| 16 | 4 | 91.2 | 0.18 | 1.67 | 27.3 | 8.21 | 3 | 0 |
| 17 | 5 | 91.4 | 0.17 | 1.70 | 121 | 7.13 | 3 | 0 |
| 18 | 6 | 90.9 | 0.18 | 1.76 | 99.6 | 6.79 | 3 | 0 |
| 19 | 7 | 91.2 | 0.19 | 1.83 | 189 | 6.56 | 3 | 0 |
| 20 | 8 | 91.0 | 0.17 | 1.81 | 146 | 6.76 | 3 | 0 |
| Comp 4 | 9 (ref) | 92.0 | 0.17 | 2.13 | 22,150 | 5.17 | 3 | 0 |

Comp 4 is an Orma lens coated with coating composition 9 which had no antistatic properties. The coating was directly spin coated with coating composition 9 on the convex front face of the lens substrate.

Compared to the article of comparative example 4, the coated articles show antistatic properties with short decay time (<200 ms), excellent adhesion to the underlying coating, high transmittance (equal or higher than 91%), low haze (<0.2%) and improved abrasion resistance.

Examples 21 to 25 and Comparative Example 5

The prepared lenses have the following structure:

Lens substrate/primer coating/antistatic hard coating on the convex (CX) side.

An Orma® Essilor lens substrate was first treated with a corona discharge or caustic solution. Then the convex surface of the lens substrate was dip coated with one latex layer W234™ (primer) and pre-cured at 75° C. for 30 minutes to get an impact resistant primer of around 1 μm thickness and then spin-coated on the front side with one of the AS coating compositions (samples 4 to 8 or ref 9), followed by a pre-cure process performed at 75° C. for 5 minutes and a post-cure process perfomed at 100° C. for 3 hours. The performance test data of the coated articles are provided in Table 12.

TABLE 12

| Example | Coating composition | Tv % | Haze % | Thickness (μm) | Decay time (ms) | Bayer | HSW | Dry Adh |
|---|---|---|---|---|---|---|---|---|
| 21 | 4 | 91.3 | 0.17 | 1.69 | 87.9 | 7.52 | 3 | 0 |
| 22 | 5 | 91.2 | 0.20 | 1.77 | 141 | 6.98 | 3 | 0 |
| 23 | 6 | 91.4 | 0.18 | 1.75 | 108 | 6.44 | 3 | 0 |
| 24 | 7 | 90.9 | 0.15 | 1.75 | 166 | 6.30 | 3 | 0 |
| 25 | 8 | 91.2 | 0.16 | 1.80 | 127 | 5.57 | 3 | 0 |
| Comp 5 | 9 Ref | 91.6 | 0.16 | 2.09 | 65,550 | 4.37 | 3 | 0 |

The article of comparative example 5 was an Orma® lens spin coated with W234 followed by a hard coating of composition 9.

Compared to the reference sample, the coated articles show antistatic properties with short decay time (<200 ms), excellent adhesion to the underlying coating, high transmittance (close to or higher than 91%), low haze (412%) and improved abrasion resistance properties.

Examples 26 to 30 and Comparative Example 6

The prepared lenses have the following structure:

On the CX surface: lens substrate/antistatic hard coating/AR stack 1/antifouling top coat On the concave(CC) surface: lens substrate/AR stack 1/Antifouling top coat.

An Orma® Essilor lens substrate was first treated with a corona discharge or caustic solution. Then the convex surface of the lens substrate was spin-coated with one of the AS coating compositions (samples 4 to 8), followed by a pre-cure process performed at 75° C. for 5 minutes and a post-cure process perfomed at 100° C. for 3 hours. Finally, both surfaces of the above-coated lenses were vacuum-deposited with AR1 stacks and Optool DSX™ top coats. The coating performance test data of the final lenses are provided in Table 13.

TABLE 13

| Example | Coating composition | Tv % | Haze % | Decay time (ms) | Bayer | HSW | Dry Adh |
|---|---|---|---|---|---|---|---|
| 26 | 4 | 97.2 | 0.16 | 35.1 | 7.31 | 3 | 0 |
| 27 | 5 | 97.3 | 0.09 | 39.0 | 6.69 | 3 | 0 |
| 28 | 6 | 97.2 | 0.15 | 35.1 | 6.79 | 3 | 0 |
| 29 | 7 | 97.3 | 0.1 | 182 | 6.48 | 3 | 0 |
| 30 | 8 | 97.4 | 0.29 | 174 | 6.17 | 3 | 0 |
| Comp 6 | 9 (Ref) | 98.2 | 0.08 | 522 | 5.20 | 3 | 0 |

Comp 6 is Orma® lens coated with coating composition 9 (ref)+AR1

Compared to Comp6, the coated articles show antistatic properties with short decay time (<200 ms), excellent adhesion to the underlying coating, high transmittance (higher than 97%), low haze (≤0.3%) and improved abrasion resistance.

Examples 31 to 35 and Comparative Example 7

The prepared lenses have the following structure:
On the CX surface: lens substrate/primer coating/antistatic hard coating/AR stack 1/antifouling top coat.
On the CC surface: lens substrate/primer coating/AR stack1/antifouling top coat.

An Orma® Essilor lens substrate was first treated with a corona discharge or caustic solution. Then the lens substrate was dip coated with one latex layer W234 (primer) and pre-cured at 75° C. for 30 minutes and then spin-coated with one of the sample solutions (sample 4-8) on the CX side, followed by a pre-cure process performed at 75° C. for 5 minutes and a post-cure process performed at 100° C. for 3 hours. Finally, both surfaces of the above-coated lenses were vacuum-deposited with AR1 stacks and DSX top coats. The performance test data of the final optical lenses are provided in Table 14.

TABLE 14

| Example | Coating composition | Tv % | Haze % | Decay time (ms) | Bayer | HSW | Dry Adh |
|---|---|---|---|---|---|---|---|
| 31 | 4 | 97.6 | 0.16 | 72.2 | 8.25 | 3 | 0 |
| 32 | 5 | 97.7 | 0.1 | 56.6 | 7.68 | 3 | 0 |
| 33 | 6 | 97.7 | 0.1 | 52.7 | 8.00 | 3 | 0 |
| 34 | 7 | 97.7 | 0.09 | 135 | 6.74 | 3 | 0 |
| 35 | 8 | 97.8 | 0.24 | 139 | 6.52 | 3 | 0 |
| Comp 7 | 9 Ref | 98.5 | 0.07 | 939 | 5.94 | 3 | 0 |

Comp 7 is a comparative Orma™ lens coated with W234+ coating composition 9+AR1 stack on the CX surface and with W234+AR stack 1 on the CC side. Compared to Comp 7, the coated articles show antistatic properties with short decay time (<200 ms), excellent adhesion to the underlying coating, high transmittance (higher than 97%), low haze (<=0.3) and improved abrasion resistance.

In the following examples 36 to 39, the coating process was a dip-coating process. The dipping speed was adjustable to allow the coating thickness generated to be in a range of 1.5-2.0 μm on each surface of a lens.

Examples 36 and 37

Coating solutions were prepared by mixing Glymo and HCl in methanol under agitation for 12 hours, then dispersing with colloidal silica, Baytron solution, MEK, Al(AcAc)$_3$, and a surfactant (FC-430). Two examples of antistatic curable coating compositions are provided in Table 15.

TABLE 15

| AS coating composition wt % | 10 | 11 |
|---|---|---|
| Glymo | 16.95 | 16.95 |
| 0.1N HCl | 4.68 | 4.68 |
| Colloidal Silica 2034 | 24.05 | 24.05 |
| Methanol | 39.78 | 39.78 |
| MEK | 2.84 | 2.84 |
| Al(AcAc)$_3$ | 1.13 | 1.13 |
| FC 430 | 0.09 | 0.09 |
| Baytron | 10.50 (P) | 10.50 (PH500) |
| Total | 100.00 | 100.00 |

The prepared lenses had the following structure: antistatic hard coat/lens substrate/antistatic hard coat, or hard coat/lens substrate/hard coat (as the comparison example).

An Orma® Essilor lens substrate was first treated with caustic solution. Then the lens substrate was dip-coated with one of the AS liquid coating compositions 10 or 11, followed by a pre-cure process performed at 75° C. for 5 minutes and a post-cure process performed at 100° C. for 3 hours. The performance test data of the resulting lenses are provided in Table 16.

TABLE 16

| Examples | Coating composition | Tv % | Haze % | Thickness (μm) of AS coating Cc | Thickness (μm) of AS coating Cx | Decay time (ms) Cc | Decay time (ms) Cx | Dry Adh Cc | Dry Adh Cx | Bayer | HSW |
|---|---|---|---|---|---|---|---|---|---|---|---|
| 36 | 10 | 90.7 | 0.17 | 1.67 | 1.71 | 183 | 143 | 0 | 0 | 11.8 | 1 or 3 |
| 37 | 11 | 90.8 | 0.12 | 1.76 | 1.78 | 55.9 | 46.2 | 0 | 0 | 13.3 | 1 or 3 |
| Comp 8 | 9 (ref) | 92.0 | 0.13 | 2.08 | 2.13 | 34,210 | 22,150 | 0 | 0 | 6.05 | 3 |

Comp 8 was an Orma® lens coated with coating composition 9.

Compared to comparative 8, the coated articles showed antistatic properties with short decay time (<200 ms), excellent adhesion to underlying coating, high transmittance (higher than 90%), low haze (<0.2%) and dramatically improved abrasion resistance.

Examples 38 and 39

The prepared lenses have the following structure:
On the CX and CC sides: lens substrate/antistatic hard coating/AR stack 1/antifouling top coat.

An Orma® Essilor lens substrate was first treated with caustic solution. Then the lens substrate was dip-coated with one of the liquid coating compositions (sample 10 or 11), followed by a pre-cure process performed at 75° C. for 5 minutes and a post-cure process performed at 100° C. for 3 hours. Finally, both surfaces of the coated lenses were vacuum-deposited with AR1 stacks and Optool DSX™ top coats. The performance test data of the resulting lenses are provided in Table 17.

TABLE 17

| Example | AS Coating composition | Tv % | Haze % | Decay time (ms) Cc | Decay time (ms) Cx | Dry Adh Cc | Dry Adh Cx | Bayer | HSW |
|---|---|---|---|---|---|---|---|---|---|
| 38 | 10 | 96.7 | 0.09 | 136 | 112 | 0 | 0 | 10.1 | 1 or 3 |
| 39 | 11 | 96.8 | 0.08 | 27.3 | 33.8 | 0 | 0 | 11.9 | 1 or 3 |
| Comp 9 | 9 (ref) | 97.9 | 0.06 | 34,210 | 22,150 | 0 | 0 | 6.64 | 3 |

Comp 9. was an Orma® lens coated with coating composition 9+AR1+Optool DSX™ on both faces. Compared to Comp 9, the coated articles showed antistatic properties with short decay time (<200 ms), excellent adhesion to the underlying coating, high transmittance (higher than 96%), low haze (<0.2%) and dramatically improved abrasion resistance.

Examples 40 to 43

The prepared lenses have the following structure: lens substrate/AS coating.
Lens substrate/AS coating Three coating compositions using Baytron P® and PH500 were prepared as below.

TABLE 18

| AS coating composition wt % | 12 | 13 |
|---|---|---|
| Glymo | 16.95 | 16.95 |
| 0.1N HCl | 4.68 | 4.68 |
| Colloidal Silica 2034 | 24.05 | 24.05 |
| Methanol | 45.28 | 35.28 |
| MEK | 2.84 | 2.84 |
| Al(AcAc)$_3$ | 1.13 | 1.13 |
| FC 430 | 0.09 | 0.09 |
| Baytron | 5.00 (PH500) | 15.00 (P) |
| Total | 100.00 | 100.00 |

An Orma® Essilor lens substrate was first treated with caustic solution. Then the convex surface of the lens substrate was spin-coated with one of the above coating compositions (sample 9, 10, 11, 12 or 13), followed by a pre-cure process performed at 75° C. for 5 minutes and a post-cure process performed at 100° C. for 3 hours. The performance test data of these films are provided in Table 19.

TABLE 19

| Example | AS coating composition | Tv % | Haze % | Thickness (μm) of AS coating | Decay time (ms) | Dry Adh | Bayer | HSW |
|---|---|---|---|---|---|---|---|---|
| 40 | 10 | 91.1 | 0.12 | 2.76 | 16.9 | 0 | 11.0 | 1 |
| 41 | 11 | 91.5 | 0.10 | 2.11 | 26.6 | 0 | 12.5 | 1 |
| 42 | 12 | 91.9 | 0.14 | 2.14 | 37.7 | 0 | 10.72 | 1 |
| 43 | 13 | 90.5 | 0.14 | 2.70 | 10.4 | 0 | 11.15 | 1 |
| Comp 10 | 9 (Ref) | 92.1 | 0.14 | 2.15 | 25,356 | 0 | 6.43 | 3 |

Comp 10 was an Orma® lens coated with coating composition 9.

Compared with Comp 10, the coated articles showed excellent antistatic properties with very short decay time (<50 ms), excellent adhesion to the underlying coating, high transmittance (higher than 90%), low haze (<0.2%) and dramatically improved abrasion resistance.

The invention claimed is:

1. An article having at least one surface comprising an antistatic coating obtained by depositing on a substrate and curing a curable composition comprising:
   a) at least one conductive polymer;
   b) colloidal particles of at least one non-conductive oxide; and
   c) at least one binder comprising at least one epoxysilane having at least two hydrolyzable groups directly linked to a Si atom of the epoxysilane, and/or its hydrolysis product,
   wherein the at least one conductive polymer and the colloidal particles of at least one non-conductive oxide are substantially not agglomerated,
   wherein content of the at least one conductive polymer in a dry extract of the curable composition is from 0.1 to 10% by weight, and content of a dry extract of the at least one epoxysilane in the dry extract of the curable composition is from 20 to 80% by weight based on total weight of the dry extract, and
   wherein the at least one conductive polymer of the curable composition is in the form of particles in a size ranging from 2 to 150 nm.

2. The article according to claim 1, wherein the at least one epoxysilane of the curable composition has a formula:

$$R_nY_mSi(X)_{4-n-m} \qquad (III)$$

wherein R groups, identical or different, are monovalent organic groups linked to the Si atom by a carbon atom and comprising at least one epoxy function; X groups, identical or different, are hydrolyzable groups; Y is a monovalent organic group linked to the Si atom by a carbon atom; and n and m are integers.

3. The article according to claim 1, wherein the at least one conductive polymer of the curable composition is selected from at least one of a polypyrrole polystyrene sulfonate and a polythiophene polystyrene sulfonate.

4. The article according to claim 1, wherein the at least one non-conductive oxide of the curable composition is selected from at least one of silicon oxide, aluminum oxide, zirconium oxide and a mixture of two or more thereof, and the colloidal particles of the at least one non-conductive oxide have a size of less than or equal to 150 nm.

5. The article according to claim 1, wherein content of the at least one non-conductive oxide in the dry extract of the curable composition ranges from more than 2% up to 50% by weight based on the total weight of the dry extract.

6. The article according to claim 1, further defined as an optical lens.

7. The article according to claim 1, wherein the at least one binder of the curable composition further comprises at least one compound of formula:

$$M(Z)_x \qquad (IX)$$

or a hydrolyzate thereof, wherein M is a metal or metalloid, Z groups are identical or different and represent hydrolyzable groups, and x is a valence of the metal or metalloid M.

8. The article according to claim 7, wherein content of a dry extract of the at least one compound of formula IX in the dry extract of the curable composition ranges from 0.5 to 30% by weight based on the total weight of the dry extract.

9. The article according to claim 1, wherein the antistatic coating has a thickness of 1 micrometer or more.

10. The article according to claim 9, wherein the content of the at least one conductive polymer in the dry extract of the curable composition ranges from 0.1 to 2% by weight.

11. The article according to claim 9, wherein at least one of a multilayer antireflective coating and an antifouling top coat is deposited over the antistatic coating.

12. The article according to claim 1, wherein thickness of the antistatic coating is less than 1 micrometer.

13. The article according to claim 12, wherein the content of the at least one conductive polymer in the dry extract of the curable coating composition ranges from 0.5 to 5% by weight based on the total weight of the dry extract.

14. The article according to claim 12, wherein a respective weight ratio of [dry extract of the at least one conductive polymer in the coating composition]/[dry extract of the at least one epoxysilane in the coating composition] ranges from 0.02 to 0.15.

15. The article according to claim 12, wherein the at least one surface comprising the antistatic coating has been previously coated, before deposition of the curable composition, providing upon curing the antistatic coating, with an outermost coating, the outermost coating being an abrasion resistant coating having a thickness of at least 1 μm.

16. The article according to claim 12, wherein the antistatic coating has an outer surface which is not nanostructured.

17. The article according to claim 12, wherein size of the colloidal particles of the at least one non-conductive oxide and/or a ratio of the at least one non-conductive oxide/the at least one binder confers a roughness to the at least one surface of the antistatic coating.

18. The article according to claim 17, wherein the roughness is such that an RMS surface roughness of the antistatic coating ranges from 5 to 50 nm.

19. The article according to claim 17, wherein the at least one binder and the at least one non-conductive oxide are comprised in the antistatic coating in an amount such that a weight ratio of the at least one binder/colloidal particles of the at least one non-conductive oxide ranges from 2:1 to 1:15.

20. The article according to claim 17, wherein the at least one binder is comprised in the coating composition in an amount ranging from 0.5 to 4% by weight, relative to the total weight of the coating composition.

21. The article according to claim 17, wherein the colloidal particles of the at least one non-conductive oxide are comprised in an amount ranging from 1 to 15% by weight, relative to the total weight of the curable composition.

22. The article according to claim 17, wherein the colloidal particles of the at least one non-conductive oxide have a size ranging from 40 to 150 nm.

23. The article according to claim 17, wherein an antifouling top coat having an outer surface is deposited directly over the antistatic coating having surface roughness.

24. The article according to claim 23, wherein the antifouling top coat reduces surface energy of the antistatic coating to less than 14 mJ/m$^2$.

25. The article according to claim 17, wherein a mono or multilayer antireflective coating having a thickness of 1 micrometer or less is directly deposited over the antistatic coating having surface roughness.

26. The article according to claim 25, wherein an outer layer of the mono or multilayer antireflective coating has an RMS surface roughness ranging from 5 to 50 nm.

27. The article according to claim 25, wherein an antifouling top coat is deposited on the outer layer of the mono or multilayer antireflective coating.

* * * * *